US008899647B2

United States Patent
Shiomi

(10) Patent No.: US 8,899,647 B2
(45) Date of Patent: Dec. 2, 2014

(54) ROBOT HAND, ROBOT, AND CONTROL METHOD FOR THE ROBOT HAND

(71) Applicant: Seiko Epson Corporation, Tokyo (JP)

(72) Inventor: Masahiro Shiomi, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/759,347

(22) Filed: Feb. 5, 2013

(65) Prior Publication Data
US 2013/0200644 A1    Aug. 8, 2013

(30) Foreign Application Priority Data

Feb. 7, 2012    (JP) .................................. 2012-023822

(51) Int. Cl.
B25J 15/00    (2006.01)
B25J 9/16    (2006.01)

(52) U.S. Cl.
CPC ................ B25J 15/00 (2013.01); B25J 9/1612 (2013.01); *Y10S 294/907* (2013.01); *Y10S 901/39* (2013.01); *Y10S 901/46* (2013.01)
USPC .............. 294/119.1; 294/2; 294/907; 901/39; 901/46

(58) Field of Classification Search
USPC .......... 294/119.1, 2, 106, 192, 207, 902, 907; 901/30, 31, 33, 36, 39, 46
See application file for complete search history.

(56) References Cited

U.S. PATENT DOCUMENTS

| | | | | |
|---|---|---|---|---|
| 4,750,132 A | * | 6/1988 | Pessina et al. | 294/119.1 |
| 4,772,170 A | * | 9/1988 | Oldfield | 294/119.1 |
| 4,819,978 A | * | 4/1989 | Scheinman et al. | 294/119.1 |
| 5,017,075 A | * | 5/1991 | Block | 294/119.1 |
| 5,125,706 A | * | 6/1992 | Kuwaki et al. | 294/119.1 |
| 5,141,274 A | * | 8/1992 | Hayden et al. | 294/119.1 |
| 5,360,249 A | * | 11/1994 | Monforte et al. | 294/119.1 |
| 5,391,050 A | * | 2/1995 | Gatteschi | 294/119.1 |
| 8,260,458 B2 | | 9/2012 | Kim et al. | |
| 8,651,543 B2 | * | 2/2014 | Matsuoka et al. | 294/192 |
| 2010/0156127 A1 | * | 6/2010 | De Kervanoael | 901/39 |

FOREIGN PATENT DOCUMENTS

| | | |
|---|---|---|
| JP | 60-167688 | 11/1985 |
| JP | 04-354690 | 12/1992 |
| JP | 2009-274204 | 11/2009 |
| JP | 2010-036328 | 2/2010 |
| JP | 2011-073099 | 4/2011 |

* cited by examiner

*Primary Examiner* — Paul T Chin

(74) *Attorney, Agent, or Firm* — Harness, Dickey & Pierce, P.L.C.

(57) ABSTRACT

A robot hand moved by a robot to grip an object to be gripped includes a plurality of bar-like placing sections on which the object to be gripped is placed, a plurality of plate-like pressing sections paired with the plurality of placing sections and configured to press side surfaces of the object to be gripped, a space adjusting section configured to move the plurality of pressing sections to bring the pressing sections into contact with a plurality of contact sections, a first strain gauge configured to detect a distance between the placing section and the pressing section and an angle of the pressing section with respect to the placing section, and a second strain gauge configured to detect a distance between the placing section and the pressing section and an angle of the pressing section with respect to the placing section.

10 Claims, 9 Drawing Sheets

FIG. 7A
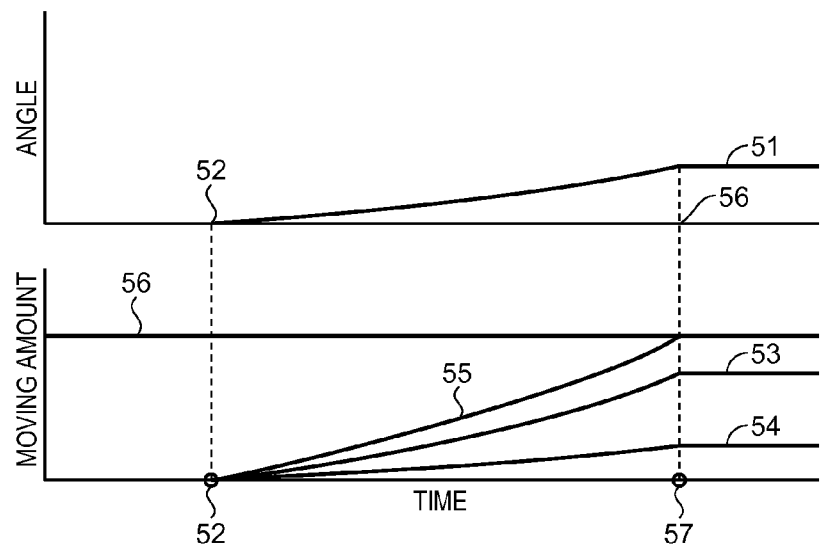
FIG. 7B
FIG. 7C
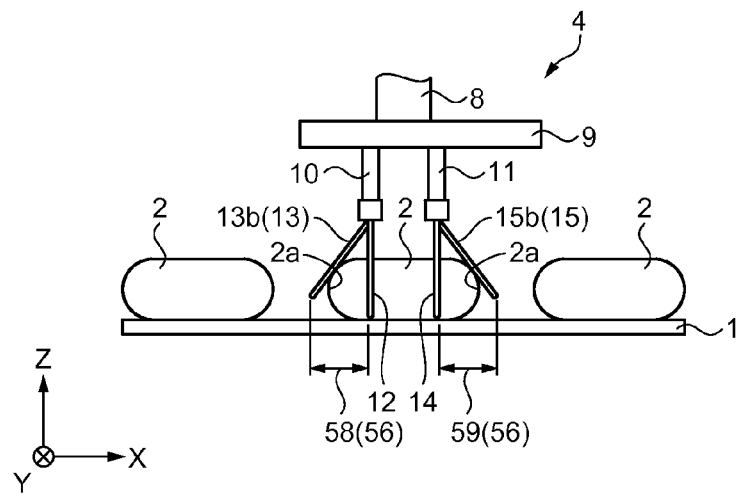
FIG. 7D
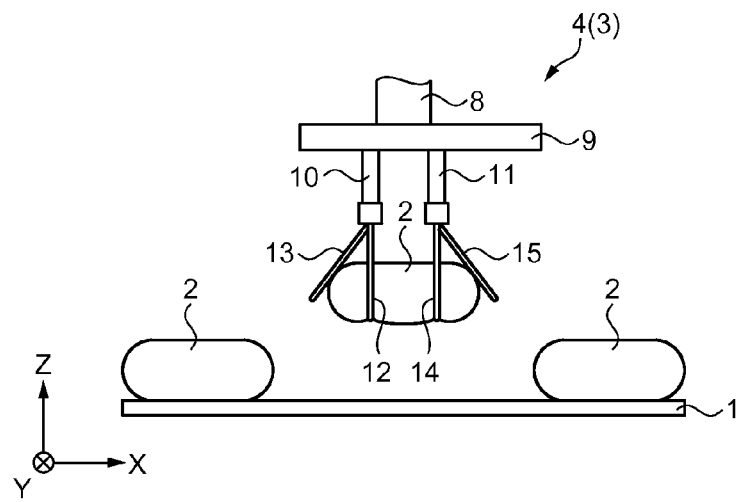

ROBOT HAND, ROBOT, AND CONTROL METHOD FOR THE ROBOT HAND

BACKGROUND

1. Technical Field

The present invention relates to a robot hand, a robot, and a control method for the robot hand.

2. Related Art

A robot that grips an object to be gripped is utilized in work such as assembly work and classification work. A user desires to cause the robot to grip various objects to be gripped. JP-A-2011-73099 (Patent Literature 1) discloses a gripping device that can grip objects ranging from a very hard object to a soft object. According to Patent Literature 1, the gripping device includes a pair of pads, the distance between which can be changed. Opposed surfaces of the pads maintain a parallel state. The gripping device holds both sides of an object to be gripped using the pads to grip the object to be gripped.

Besides, JP-A-2010-36328 (Patent Literature 2) discloses a robot hand that lifts and grips an object to be gripped. According to Patent Literature 2, thin plate-like claw sections are set at the distal ends of fingers of the robot hand. The robot hand inserts the claw sections between the bottom surface of the object to be gripped and a plane on which the object to be gripped is placed and lifts the object to be gripped. In this method, since the robot hand supports the object to be gripped on the bottom surface, the robot hand can grip even a soft object to be gripped.

The gripping device disclosed in Patent Literature 1 holds a soft object using the side surfaces of the pads. Therefore, when the soft object is deformed by the pressing of the pads, the gripping device cannot grip the soft object. The robot hand disclosed in Patent Literature 2 cannot insert the claw sections when the distance between adjacent objects to be gripped is small. Therefore, there is a demand for a robot hand that can stably grip an object to be gripped even when soft objects to be gripped are located side by side.

SUMMARY

An advantage of some aspects of the invention is to solve at least a part of the problems described above, and the invention can be implemented as the following forms or application examples.

APPLICATION EXAMPLE 1

This application example is directed to a robot hand that grips an object to be gripped, the robot hand including: a plurality of bar-like placing sections on which the object to be gripped is placed; pressing sections paired with the placing sections and configured to press side surfaces of the object to be gripped; a space adjusting section configured to move the placing sections to adjust a space between the plurality of placing sections and move the pressing sections to bring the pressing sections into contact with the object to be gripped; and a detecting section configured to detect an angle of the placing section and the pressing section paired with each other and a placing section-pressing section angle, which is an angle of the pressing section twisted with respect to the placing section.

According to this application example, the robot hand includes the plurality of bar-like placing sections. The space adjusting section moves the placing sections to adjust the space between the placing sections. It is possible to place the object to be gripped on the placing sections by setting the space between the placing sections to a space smaller than the length of the object to be gripped. Further, since the pressing sections press the side surfaces of the object to be gripped, it is possible to adjust the distances between the placing sections and the side surfaces of the object to be gripped. Therefore, it is possible to stably place the object to be gripped on the placing sections. As a result, the robot hand can grip a soft object to be gripped. When objects to be gripped are located side by side, the bar-like placing sections are caused to pass among the objects to be gripped. Consequently, it is possible to move the placing sections to the bottom of the object to be gripped. Therefore, it is possible to grip the object to be gripped even when the objects to be gripped are located side by side.

Further, the placing sections and the pressing sections are paired. The detecting section detects the placing section-pressing section angle. The placing section-pressing section angle changes to correspond to a place where the pressing section and the object to be gripped come into contact. By detecting the placing section-pressing section angle, even when the pressing section is in contact with the object to be gripped while being twisted with respect to the object to be gripped, it is possible to estimate a place where the pressing section is in contact with the object to be gripped. Consequently, it is possible to estimate a place where the object to be gripped is located.

When a robot moves the robot hand, relative positions of the object to be gripped and the robot hand change. Consequently, it is possible to change relative positions of the placing sections and the pressing sections forming a plurality of the pairs. Therefore, the robot is caused to move the robot hand and the distances between the pressing sections in places where the pressing sections come into contact with the object to be gripped and the placing sections paired with the pressing sections are set to the same distance, whereby it is possible to set the distances between the center of gravity of the object to be gripped and the placing sections to an equal distance. Therefore, the robot hand can stably grip the object to be gripped.

APPLICATION EXAMPLE 2

This application example is directed to the robot hand according to the application example described above, which further includes a control section configured to calculate a placing section-pressing section distance, which is the distance between the placing section and the pressing section paired with each other, and a distance after correction obtained by correcting the placing section-pressing section distance using the twisting angle and control the placing sections to set the distances after correction in the plurality of pairs of the placing sections and the pressing sections to the same distance.

According to this application example, the placing sections and the pressing sections are paired. The control section calculates the distances after correction obtained by correcting the placing section-pressing section distance using the placing section-pressing section angle. The control section controls the placing sections to set the distances after correction in the pairs to the same distance. Since the pressing sections press the side surfaces of the object to be gripped, the pressing sections are in contact with the side surfaces. Therefore, since the placing sections are located in places at an equal distance from the side surfaces of the object to be gripped, it is possible to set the distances between the center of gravity of the object to be gripped and the placing sections to the equal distance. Therefore, the robot hand can stably grip the object to be gripped.

APPLICATION EXAMPLE 3

This application example is directed to the robot hand according to the application example described above, wherein the detecting section includes a first strain gauge set in the pressing section and configured to detect the placing section-pressing section distance using a strain in bending the pressing section and a second strain gauge configured to detect the placing section-pressing section angle using a strain in twisting the pressing section, and a direction in which the second strain gauge detects the strain is set obliquely with respect to a direction in which the first strain gauge detects the strain.

According to this application example, the first strain gauge detects the placing section-pressing section distance and the second strain gauge detects the placing section-pressing section angle. The strain gauges expand and contract according to the deformation of the pressing section to detect the deformation of the pressing section. The first strain gauge detects the placing section-pressing section distance using the strain in bending the pressing section. The second strain gauge is set in a place where the second strain gauge detects the placing section-pressing section angle using the strain in twisting the pressing section. The direction in which the first strain gauge detects the strain and the direction in which the second strain gauge detects the strain are obliquely set. Therefore, when one strain gauge detects a strain due to bending stress, the other strain gauge can detect a strain due to twisting stress. Therefore, it is possible to detect an angle in bending of the pressing section and a rotation angle in twisting of the pressing section.

APPLICATION EXAMPLE 4

This application example is directed to the robot hand according to the application example described above, wherein the pressing section includes a contact section configured to come into contact with the object to be gripped and a leaf spring section connected to the contact section and having elasticity, the first strain gauge and the second strain gauge being set in the leaf spring section, and the width of the leaf spring section is smaller than the width of the contact section.

According to this application example, the pressing section includes the leaf spring section and the contact section. The width of the leaf spring section is smaller than the width of the contact section. Consequently, the leaf spring section easily bends and easily twists. The leaf spring section bends according to the placing section-pressing section distance. The leaf spring section twists according to the placing section-pressing section angle. Since the first strain gauge and the second strain gauge are set in the leaf spring section, the detecting section can detect the placing section-pressing section distance and the placing section-pressing section angle with high sensitivity.

APPLICATION EXAMPLE 5

This application example is directed to the robot hand according to the application example described above, wherein the pressing section is connected to the space adjusting section and the detecting section is set on the space adjusting section side of the pressing section.

According to this application example, the detecting section and the space adjusting section are set in the robot hand. The detecting section includes the strain gauges and tends to be damaged by cleaning and sterilization. When the robot hand grips the object to be gripped, a part of the object to be gripped sometimes adheres to the placing section and the pressing section. When the object to be gripped adheres, it is possible to purify the placing section and the pressing section by cleaning and sterilizing the placing section and the pressing section. Since the detecting section is set on the space adjusting section side of the pressing section, it is possible to clean and sterilize the pressing section in such a manner that the detecting section is not damaged by the cleaning and the sterilization.

APPLICATION EXAMPLE 6

This application example is directed to the robot hand according to the application example described above, wherein the pressing section includes a first pressing section and a second pressing section arranged side by side, each of the first pressing section and the second pressing section includes the leaf spring section and the contact section, and a place between the first pressing section and the second pressing section is located in the center of the placing section.

According to this application example, the first pressing section and the second pressing section are arranged side by side. Each of the first pressing section and the second pressing section includes the leaf spring section and the contact section connected to the leaf spring section. When the object to be gripped comes into contact with a place between the leaf spring section and the second pressing section in the contact section of the first pressing section, the leaf spring section of the first pressing section twists. Consequently, the first pressing section pivots and a surface of the contact section in contact with the object to be gripped inclines.

Further, when the pressing section is moved to the object to be gripped side, the object to be gripped moves along the inclined surface of the contact section of the first pressing section. Consequently, the object to be gripped moves to the place between the first pressing section and the second pressing section. The place between the first pressing section and the second pressing section is located in the center of the placing section. Therefore, since the robot hand places the object to be gripped near the center of the placing section, the robot hand can stably grip the object to be gripped.

APPLICATION EXAMPLE 7

This application example is directed to the robot hand according to the application example described above, wherein the detecting section includes a first sensor configured to detect an angle of the placing section and the pressing section paired with each other and a second sensor configured to detect an angle of the pressing section twisted with respect to the placing section.

According to this application example, the first sensor detects the angle of the placing section and the pressing section paired with each other. The second sensor detects the angle of the pressing section twisted with respect to the placing section. The two sensors detect the angles different from each other. If one sensor detects the angles, the structure of the sensor is complicated. The sensors having simple structure compared with the sensor having the complicated structure can be used. Therefore, it is possible to manufacture the robot hand with high productivity.

APPLICATION EXAMPLE 8

This application example is directed to a control method for a robot hand that grips an object to be gripped on a placing table, the control method including: moving a plurality of pairs of placing sections and pressing sections, moving a plurality of bar-like placing sections between the placing table and the object to be gripped, and bringing the pressing sections into contact with side surfaces of the object to be gripped; detecting a placing section-pressing section distance, which is a distance between the placing section and the pressing section paired with each other, detecting a placing section-pressing section angle, which is an angle of the pressing section with respect to the placing section, and calculating a distance after correction obtained by correcting the placing section-pressing section distance using the placing section-pressing section angle; determining whether the distance after correction reaches a determination value; and ending the movement of the placing sections when the distance after correction reaches the determination value. The movement of the placing sections, the detection of the distances, and the determination of the distance after correction are repeated to set the distance after correction to a distance indicated by the determination value.

According to this application example, the plurality of placing sections and the pressing sections are paired and the placing sections are bar-like. In the movement of the placing sections, the robot hand moves the placing sections between the placing table and the object to be gripped. The robot hand moves the pressing sections and brings the pressing sections into contact with the side surfaces of the object to be gripped. In the detection of the distances, the robot hand detects the placing section-pressing section distance, which is the distance between the placing section and the pressing section paired with each other, and detects the placing section-pressing section angle, which is the angle of the pressing section with respect to the placing section. The robot hand calculates the distance after correction obtained by correcting the placing section-pressing section distance using the placing section-pressing section angle. In the determination of the distance after correction, the robot hand determines whether the distance after correction reaches the determination value. When the distance after correction reaches the determination value in the stopping step, the robot hand ends the movement of the placing sections.

After the pressing sections come into contact with the side surfaces of the object to be gripped, the placing sections are moved until the distance after correction reaches the determination value. When the distance after correction reaches the determination value, the distance between the side surfaces of the object to be gripped and the placing sections is a predetermined distance. Therefore, the plurality of placing sections are located in places at the predetermined distance from the side surfaces of the object to be gripped. The object to be gripped is placed on the placing sections. Therefore, the robot hand can stably grip the object to be gripped. Further, the distance after correction is a distance obtained by correcting the angle of the pressing section with respect to the placing section on the basis of the placing section-pressing section distance. Therefore, the robot hand can grip, with high quality, the object to be gripped even when there is the pressing section tilting with respect to the placing section and the pressing section not tilting with respect to the placing section.

APPLICATION EXAMPLE 9

This application example is directed to a robot including a robot hand. The robot hand is the robot hand according to any one of the application examples explained above.

According to this application example, the robot hand included in the robot is the robot hand explained above. The robot hand can stably grip the object to be gripped. Therefore, the robot can be a robot including the robot hand that can stably grip the object to be gripped.

APPLICATION EXAMPLE 10

This application example is directed to a robot including: a robot hand including a plurality of bar-like placing sections on which an object to be gripped is placed, pressing sections paired with the placing sections and configured to press side surfaces of the object to be gripped, a space adjusting section configured to move the placing sections to adjust a space between the plurality of placing sections and move the pressing sections to bring the pressing sections into contact with the object to be gripped, and a detecting section configured to detect an angle of the placing section and the pressing section paired with each other and a placing section-pressing section angle that is an angle of the pressing section twisted with respect to the placing section; a movable section configured to move the robot hand; and a control section configured to control the actions of the robot hand and the movable section. The control section moves the placing sections to adjust a space between the plurality of placing sections and moves the pressing sections to bring the pressing sections into contact with the object to be gripped. The control section controls the placing sections and the movable section to set the distances between places where the pressing sections in the pairs of the plurality of placing sections and the pressing sections come into contact with the object to be gripped and the placing sections to the same distance.

According to this application example, the robot includes the robot hand, the movable section, and the control section. The robot hand includes the placing sections, the pressing sections, the space adjusting section, and the detecting section. The space adjusting section adjusts the space between the placing sections and places the object to be gripped on the placing sections. The space adjusting section brings the pressing sections into contact with the object to be gripped. The detecting section detects the placing section-pressing section angle. The control section adjusts, using an output of the detecting section, the distance between the placing section and the pressing section paired with each other. Therefore, since the robot can control the positions of the placing sections and the pressing sections with respect to the object to be gripped, the robot can stably grip the object to be gripped.

BRIEF DESCRIPTION OF THE DRAWINGS

The invention will be described with reference to the accompanying drawings, wherein like numbers reference like elements.

FIGS. 7A to 7D are schematic diagrams for explaining the control method for the robot hand in the gripping work.

DESCRIPTION OF EXEMPLARY EMBODIMENTS

First Embodiment

Figure 1A:
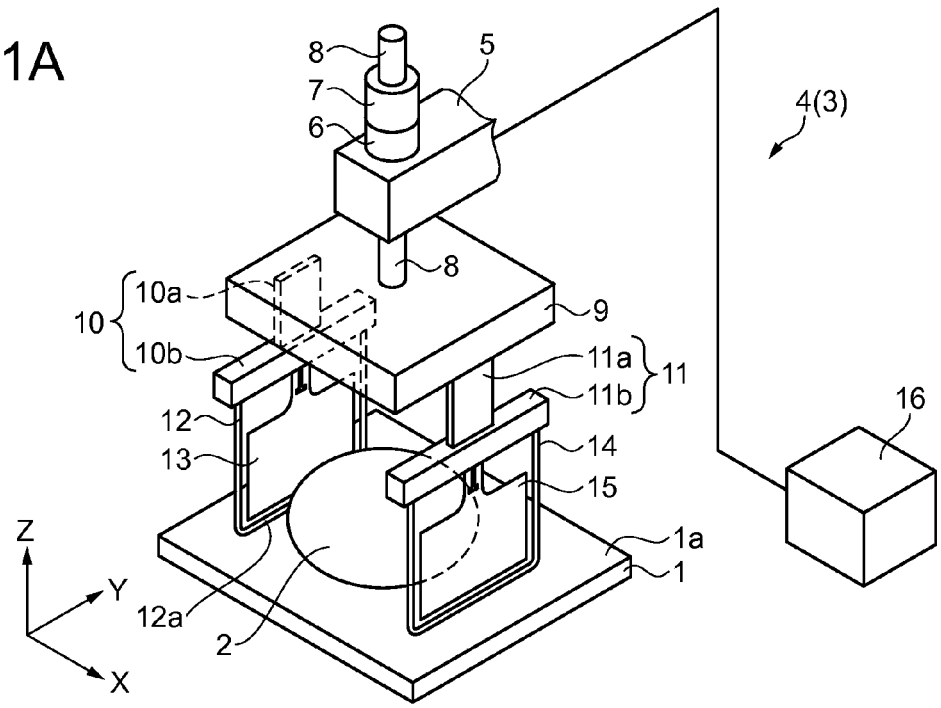
FIG. 1A is a schematic perspective view showing the configuration of a robot hand according to a first embodiment.

In a first embodiment, a characteristic robot hand and an example in which an object to be gripped is gripped using the robot hand are explained with reference to FIGS. 1A to 1C to FIGS. 7A to 7D. FIG. 1A is a schematic perspective view showing the configuration of the robot hand.

As shown in FIG. 1A, an object to be gripped 2 is placed on a square plate-like placing table 1. A surface facing upward in the figure of the placing table 1 is a plane 1a. The direction of the normal of the plane 1a is a direction opposite to a direction in which gravitational acceleration acts. This direction is represented as Z direction. Directions along the plane 1a are represented as X direction and Y direction. The X direction, the Y direction, and the Z direction are directions orthogonal to one another.

The object to be gripped 2 is a soft object, for example, an object of a form such as a cream croquette, konnyaku (vegetable gelatin), tofu, or kanten (seaweed gelatin). The object to be gripped 2 is easily deformed by pressing. When the pressing is stopped, the object to be gripped 2 returns to the original shape. Therefore, when opposed side surfaces 2a of the object to be gripped 2 are held and gripped, it is difficult to grip the object to be gripped 2 because the object to be gripped 2 is deformed. To clearly show the figure, only one object to be gripped 2 is placed on the placing table 1. However, a plurality of the objects to be gripped 2 may be arrayed and set on the placing table 1.

A robot hand 4 set in a robot 3 is located in the Z direction of the object to be gripped 2. The robot 3 includes an arm 5 functioning as a movable section extending in the Y direction and a plurality of arms and a plurality of joints, which are not shown in the figure, connected to the arm 5. The robot 3 can move the arm 5 by pivoting these joints.

A lifting and lowering mechanism 6 and a rotating mechanism 7 are set at the distal end of the arm 5. The lifting and lowering mechanism 6 and the rotating mechanism 7 pivot a lifting/lowering and rotating shaft 8 to reciprocatingly move the lifting/lowering and rotating shaft 8 in the Z direction. The structures of the lifting and lowering mechanism 6 and the rotating mechanism 7 are not specifically limited. For example, in this embodiment, the lifting and lowering mechanism 6 has structure in which a motor and a ball screw are combined. The ball screw linearly moves the lifting/lowering and rotating shaft 8. The rotating mechanism 7 has structure in which a motor and a reduction gear are combined. The reduction gear pivots the lifting/lowering and rotating shaft 8.

The robot hand 4 is set at one end in a –Z direction of the lifting/lowering and rotating shaft 8. The robot hand 4 includes a space adjusting section 9 connected to the lifting/lowering and rotating shaft 8. A first supporting section 10 and a second supporting section 11 are set on a –Z side of the space adjusting section 9 to be connected to the space adjusting section 9.

The space adjusting section 9 includes a liner moving mechanism and reciprocates between the first supporting section 10 and the second supporting section 11 in the X direction. The space adjusting section 9 can move the first supporting section 10 and the second supporting section 11 independently from each other. Consequently, the space adjusting section 9 includes a function of adjusting the distance between the first supporting section 10 and the second supporting section 11. The structure of the linear moving mechanism included in the space adjusting section 9 is not specifically limited. However, in this embodiment, the liner moving mechanism is configured by combining a step motor and a ball screw.

The first supporting section 10 has a shape in which a rectangular parallelepiped lateral member 10b long in the Y direction is connected in the center at one end of a square bar-like longitudinal member 10a long in the Z direction. Similarly, the second supporting section 11 has a shape in which a rectangular parallelepiped lateral member 11b long in the Y direction is connected in the center at one end of a square bar-like longitudinal member 11a long in the Z direction. The longitudinal member 10a and the longitudinal member 11a are connected to the linear moving mechanism of the space adjusting section 9. The space between the longitudinal member 10a and the longitudinal member 11a is adjusted by the space adjusting section 9.

The material of the first supporting section 10 and the second supporting section 11 only has to be a material resistible against cleaning and sterilization and is not specifically limited. Metal, silicone resin, and the like can be used. In this embodiment, for example, stainless steel is adopted as the material of the first supporting section 10 and the second supporting section 11. For the cleaning, for example, a method in which a method of immersing the supporting sections in cleaning liquid and ultrasonically cleaning the supporting sections and mechanical cleaning such as brushing are combined can be used. For the sterilization, for example, sterilization by boiling, chlorination, and the like can be performed.

A placing section 12 and a pressing section 13 are set on the –Z side of the lateral member 10b. The placing section 12 is formed using a round bar. The lateral member 10b and the placing section 12 form a square frame. The placing section 12 has strength enough for the placing section 12 and is not to be easily deformed even if the placing section 12 moves to a place between the placing table 1 and the object to be gripped 2. A bottom section 12a located on the side of the –Z direction of the placing section 12 is linearly formed and is parallel to the plane 1a. Consequently, the placing section 12 can be moved along the plane 1a. Therefore, the placing section 12 can be easily moved between the object to be gripped 2 and the plane 1a.

The pressing section 13 is arranged in a place surrounded by the lateral member 10b and the placing section 12. The pressing section 13 includes a substantially square plate. Similarly, in the second supporting section 11, a placing section 14 and a pressing section 15 are set on the –Z side of the lateral member 11b. The placing section 14 has the same shape and the same function as the placing section 12 of the first supporting section 10. The pressing section 15 has the same shape and the shame function as the pressing section 13 of the first supporting section 10. The material of the pressing section 13 and the pressing section 15 is desirably the same as the material of the first supporting section 10 and the second supporting section 11. Besides being plate-like sections, the pressing section 13 and the pressing section 15 may be sections formed along predetermined surfaces by metal wires.

A control section 16 is set to be connected to the robot hand 4. The control section 16 receives the input of a signal output by a sensor set in the robot hand 4 and controls the space adjusting unit 9.

Figure 1B:
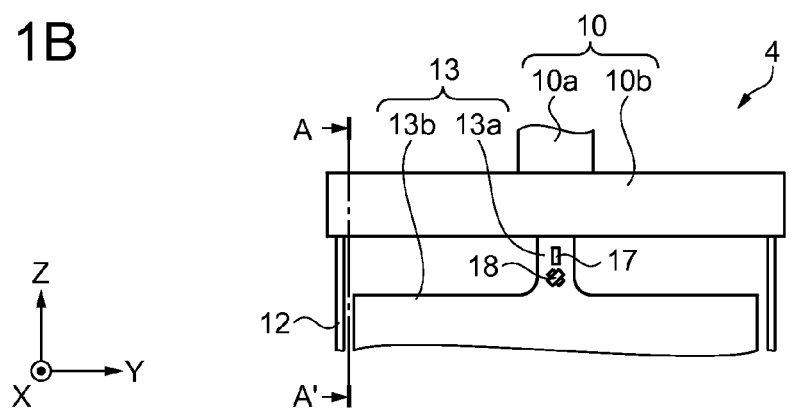
FIG. 1B is a schematic front view showing the structure of a first supporting section according to the first embodiment.
Figure 1C:
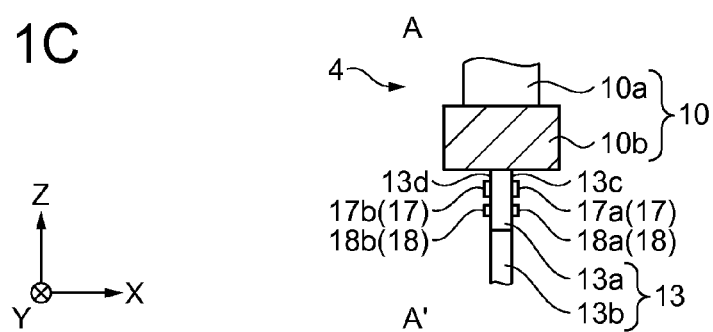
FIG. 1C is a schematic side sectional view showing the structure of the first supporting section.

FIG. 1B is a schematic front view showing the structure of the first supporting section. FIG. 1C is a schematic side sectional view showing the structure of the first supporting section. FIG. 1C is a diagram viewed from line A-A' in FIG. 1B. As shown in FIGS. 1B and 1C, the pressing section 13 includes a leaf spring section 13a and a contact section 13b connected to the leaf spring section 13a. The leaf spring section 13a and the contact section 13b are formed from one metal plate. The leaf spring section 13a is fixed in the center of the lateral member 10b. The placing section 12 is arranged along one plane. The contact section 13b is set along the plane. Consequently, when viewed from the Y direction, the placing section 12 and the pressing section 13 are arranged to overlap.

The width in the Y direction of the leaf spring section 13a is smaller than the contact section 13b. Consequently, the leaf spring section 13a easily bends and easily twists. In the leaf spring section 13a, first strain gauges 17 functioning as a first sensor and a detecting section and second strain gauges 18 functioning as a second sensor and a detecting section are set. The first strain gauges 17 and the second strain gauges 18 only have to be capable of detecting expansion and contraction of the leaf spring section 13a. A metal resistance sensor, a semiconductor sensor, a piezoelectric sensor, and a quartz sensor can be used. In this embodiment, for example, the metal resistance sensor is used as the first strain gauges 17 and the second strain gauges 18.

The longitudinal direction of the first strain gauges 17 is set in the Z direction. The first strain gauges 17 detect a degree at which the leaf spring section 13a is strained when the contact section 13b tilts in a −X direction. The longitudinal direction of the second strain gauges 18 is set in a direction of a bisector of an angle between the Y direction and the Z direction. The second strain gauges 18 detect a degree at which the leaf spring section 13a twists to be strained when the contact section 13b rotates with a rotation axis set in the Z direction. The longitudinal directions of the first strain gauges 17 and the second strain gauges 18 are directions in which strains are detected. Therefore, the directions in which the second strain gauges 18 detect strains are set oblique to the direction in which the first strain gauges 17 detect a strain.

A surface on the X direction side of the pressing section 13 is a surface that comes into contact with the object to be gripped 2. The surface is represented as contact surface 13c. A surface on the opposite side of the contact surface 13c is represented as noncontact surface 13d. The first strain gauges 17 and the second strain gauges 18 are set on the contact surface 13c and the noncontact surface 13d. The first strain gauges 17 and the second strain gauges 18 set on the contact surface 13c are respectively represented as contact-side first strain gauge 17a and contact-side second strain gauges 18a. The first strain gauge 17 and the second strain gauges 18 set on the noncontact surface 13d are respectively represented as noncontact-side first strain gauge 17b and noncontact-side second strain gauges 18b.

The contact-side first strain gauge 17a and the noncontact-side first strain gauge 17b are set to set strain detecting directions thereof in the same direction. When the pressing section 13 presses the object to be gripped 2, the contact-side first strain gauge 17a expands and the noncontact-side first strain gauge 17b contracts. The contact-side first strain gauge 17a and the non-contact side first strain gauge 17b are arranged in opposed places of a Wheatstone bridge circuit. Consequently, it is possible to detect a strain due to bending of the leaf spring section 13a with high sensitivity.

The contact-side second strain gauges 18a are set to set strain detecting directions thereof in orthogonal two directions. Further, the noncontact-side second strain gauges 18b are also set to set strain detecting directions thereof in orthogonal two directions. When the pressing section 13 twists, one of the contact-side second strain gauges 18a expands and the other contracts according to a twisting direction. Similarly, one of the noncontact-side second strain gauges 18b expands and the other contracts. A pair of the contact-side second strain gauges 18a is arranged in adjacent places of the Wheatstone bridge circuit. Similarly, a pair of the noncontact-side second strain gauges 18b is arranged in adjacent places of the Wheatstone bridge circuit. A strain due to the twist of the leaf spring section 13a can be detected with high sensitivity by the contact-side second strain gauges 18 and the noncontact-side second strain gauges 18b.

The pressing section 15 and the pressing section 13 have the same structure. The pressing section 15 and the pressing section 13 include leaf spring sections and contact sections in places corresponding to the leaf spring section 13a and the contact section 13b. In the pressing section 15, the first strain gauges 17 and the second strain gauges 18 are set on both surfaces of the leaf spring section. The first strain gauges 17 and the second strain gauges 18 can detect a bend and a twist in the leaf spring section of the pressing section 15 with high sensitivity.

The material of the placing section 12, the pressing section 13, the placing section 14, and the pressing section 15 only has to be a material resistible against cleaning and sterilization and is not specifically limited. In this embodiment, for example, stainless steel is adopted as the material of the placing section 12, the pressing section 13, the placing section 14, and the pressing section 15. Metal is a material that is less easily deteriorated even if cleaned and sterilized. Therefore, it is possible to clean and sterilize the placing section 12, the pressing section 13, the placing section 14, and the pressing section 15 while suppressing deterioration thereof. Further, places to be cleaned and sterilized of the placing section 12, the pressing section 13, the placing section 14, and the pressing section 15 are places close to the placing table 1 and on the opposite side of the space adjusting section 9. Therefore, it is possible to clean the placing sections and the pressing sections while suppressing cleaning liquid and sterilizing liquid from adhering to the space adjusting section 9.

Figure 2A:
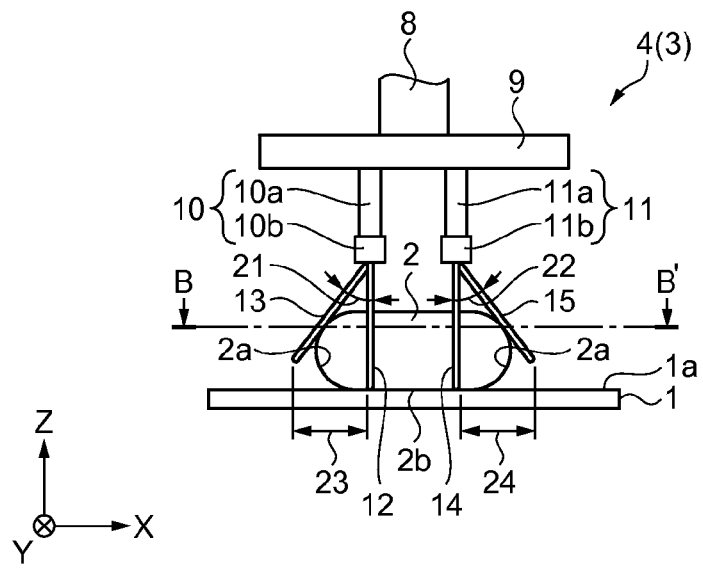
FIG. 2A is a schematic front view showing the configuration of the robot hand.

FIG. 2A is a schematic front view showing the configuration of the robot hand. FIG. 2A shows a state in which the robot hand grips the object to be gripped 2. As shown in FIG. 2A, the space adjusting section 9 moves the first supporting section 10 and the second supporting section 11 to set the space between the first supporting section 10 and the second supporting section 11 smaller than the length in the X direction of the object to be gripped 2. A bottom 2b of the object to be gripped 2 is in contact with the plane 1a of the placing table 1. The placing section 12 and the placing section 14 move between the plane 1a of the placing table 1 and a bottom 2b of the object to be gripped 2. The object to be gripped 2 is placed on the placing section 12 and the placing section 14.

The pressing section 13 and the pressing section 15 come into contact with side surfaces 2a of the object to be gripped 2 and press the side surfaces 2a. Therefore, the placing section 12 moves away from the pressing section 13 and the placing section 14 moves away from the pressing section 15. An angle formed by the placing section 12 and the pressing section 13 at this point is represented as first angle 21. An angle formed by the placing section 14 and the pressing section 15 at this point is represented as second angle 22. The first angle 21 is an angle calculated using strain amounts detected by the first strain gauges 17 and the second strain gauges 18 set in the first supporting section 10. The second angle 22 is an angle calculated using strain amounts detected by the first strain gauges 17 and the second strain gauges 18 set in the second supporting section 11.

The distance in the X direction between an end of the pressing section 13 on the placing table 1 side and an end of the placing section 12 on the placing table 1 side is represented as first placing section-pressing section distance 23, which is a placing section-pressing section distance. Since the length of the contact section 13b is known length, the control section 16 can easily calculate the first placing section-pressing section distance 23 by using the first angle 21 and a trigonometric function. Similarly, the distance in the X direction between an end of the pressing section 15 on the placing table 1 side and an end of the placing section 14 on the placing table 1 side is represented as second placing section-pressing section distance 24, which is a placing section-pressing section distance. Since the length of the contact section of the pressing section 15 is known length, the control section 16 can easily calculate the second placing section-pressing section distance 24 by using the second angle 22 and the trigonometric function.

Figure 2B:
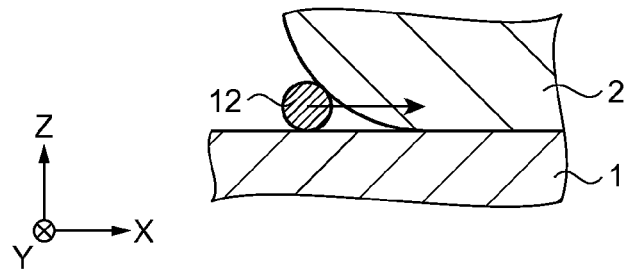
FIG. 2B is a main part schematic sectional view showing a placing section.

FIG. 2B is a main part schematic sectional view showing the placing section. FIG. 2B shows a state in which the placing section 12 moves between the placing table 1 and the object to be gripped 2. As shown in FIG. 2B, the sectional shape of the placing section 12 is a circle. Therefore, when the placing section 12 moves along the object to be gripped 2, the placing section 12 is less easily caught by the placing table 1 and the object to be gripped 2. As a result, the placing section 12 can easily move along the object to be gripped 2.

Figure 2C:
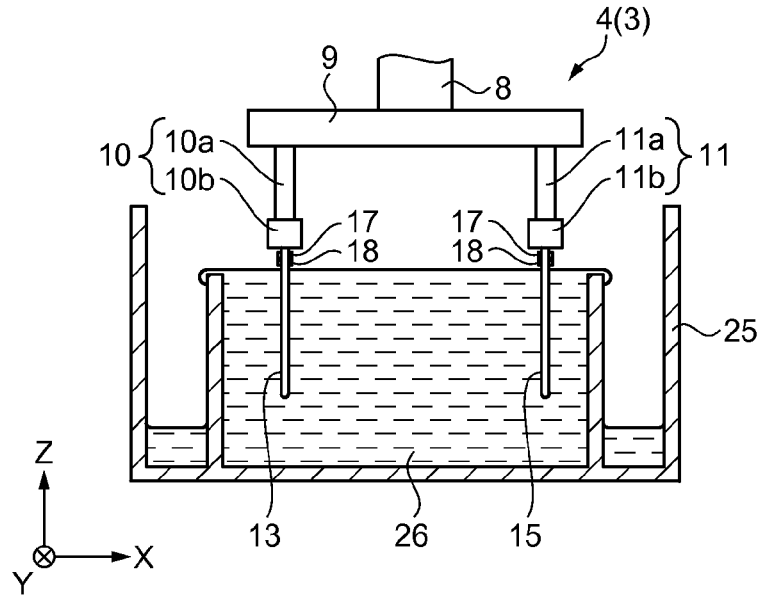
FIG. 2C is a schematic diagram for explaining cleaning of the robot hand.

FIG. 2C is a schematic diagram for explaining cleaning of the robot hand. When the robot hand 4 grips the object to be gripped 2, a part of the object to be gripped 2 sometimes adheres to the placing section 12, the pressing section 13, the placing section 14, and the pressing section 15. When an operator desires to remove a part of the object to be gripped 2 adhering to the robot hand 4, the operator cleans the robot hand 4. As shown in FIG. 2C, cleaning liquid 26 is filled in a purification tank 25. The operator immerses the placing section 12, the pressing section 13, the placing section 14, and the pressing section 15 in the cleaning liquid 26. A not-shown ultrasonic generator is set in the purification tank 25. The ultrasonic generator vibrates the cleaning liquid 26. Consequently, ultrasonic cleaning of the placing section 12, the pressing section 13, the placing section 14, and the pressing section 15 is performed.

The first strain gauges 17 and the second strain gauges 18 are set on the space adjusting section 9 sides of the pressing section 13 and the pressing section 15. Therefore, even when the placing section 12, the pressing section 13, the placing section 14, and the pressing section 15 are immersed in the cleaning liquid 26, the first strain gauges 17 and the second strain gauges 18 are prevented from being immersed in the cleaning liquid 26. The first strain gauges 17 and the second strain gauges 18 are sometimes damaged by the cleaning liquid 26. In the robot hand 4 according to this embodiment, since the first strain gauges 17 and the second strain gauges 18 do not come into contact with the cleaning liquid 26, it is possible to prevent the first strain gauges 17 and the second strain gauges 18 from being damaged by the cleaning liquid 26.

Figure 3:
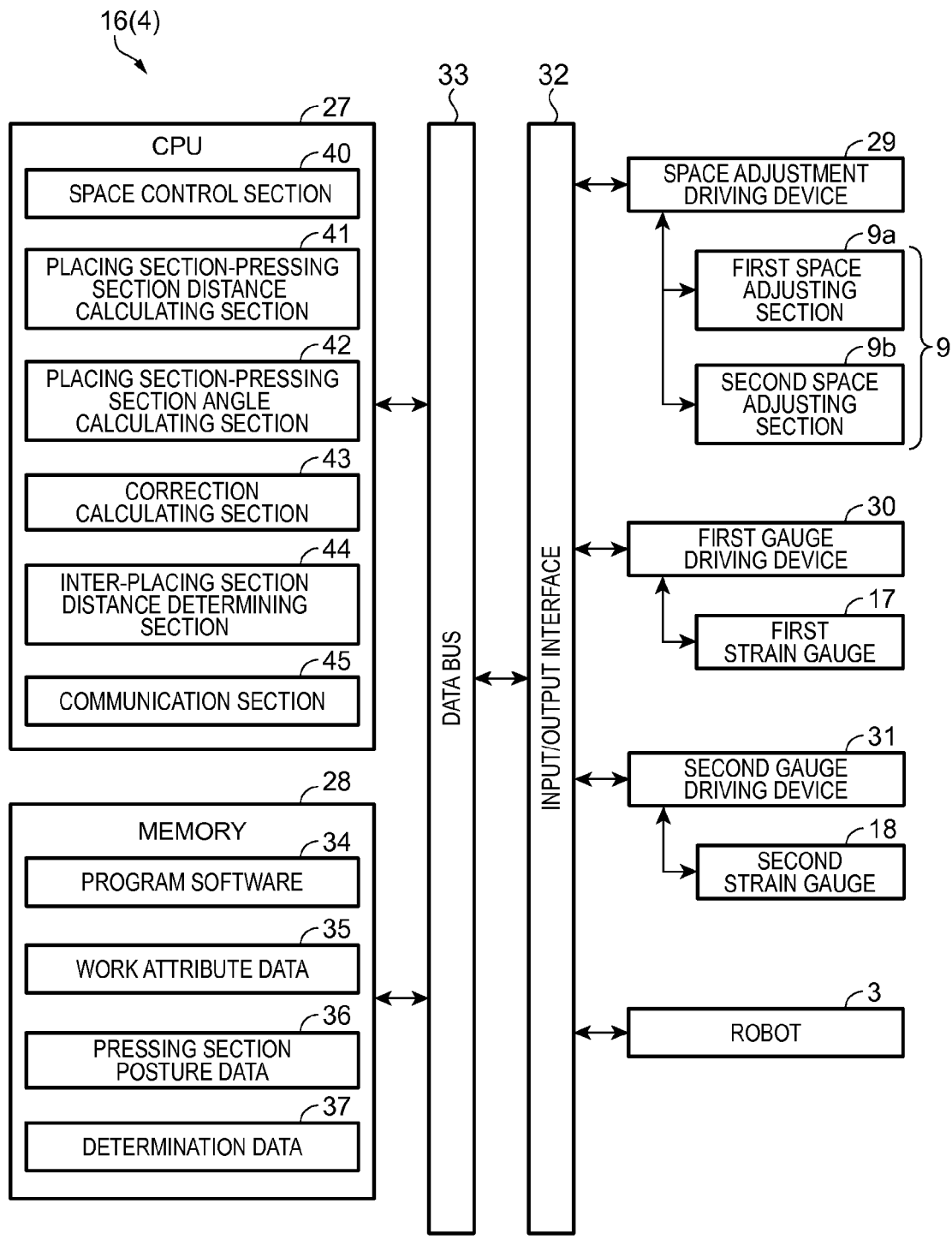
FIG. 3 is an electric control block diagram of the robot hand.

FIG. 3 is an electric control block diagram of the robot hand. In FIG. 3, the robot hand 4 includes the control section 16 configured to control the action of the robot hand 4. The control section 16 includes a CPU (central processing unit) 27 functioning as a processor to perform various kinds of arithmetic processing and a memory 28 configured to store various kinds of information. Further, a space adjustment driving device 29, a first gauge driving device 30, a second gauge driving device 31, and the robot 3 are connected to the CPU 27 via an input/output interface 32 and a data bus 33.

The space adjustment driving device 29 is a device that drives the space adjusting section 9. The space adjusting section 9 includes a first space adjusting section 9a and a second space adjusting section 9b. The first space adjusting section 9a moves in the first supporting section 10. The second space adjusting section 9b moves in the second supporting section 11. The space adjustment driving device 29 can move the first space adjusting section 9a and the second space adjusting section 9b independently from each other.

The first gauge driving device 30 is a device that drives the first strain gauges 17. The second gauge driving device 31 is a device that drives the second strain gauges 18. The first gauge driving device 30 and the second gauge driving device 31 include power supply circuits and current detecting circuits besides Wheatstone bridge circuits and detect changes in resistance values of the first strain gauges 17 and the second strain gauges 18. The first gauge driving device 30 and the second gauge driving device 31 output electric signals corresponding to a bend and a twist of the leaf spring section 13a to the CPU 27.

In terms of a concept, the memory 28 includes semiconductor memories such as a RAM and a ROM and external storage devices such as a hard disk and a DVD-ROM. In terms of functions, in the memory 28, a storage region for storing program software 34 describing a control procedure for the action of the robot hand 4 and a storage region for storing work attribute data 35, which is data such as the shape, the weight, and the softness of the object to be gripped 2, are set. Besides, a storage region for storing pressing section posture data 36, which is data such as the first placing section-pressing section distance 23 and the second placing section-pressing section distance 24 calculated using the first angle 21 and the second angle 22, is set. Further, a storage region for storing determination data 37 for comparing a distance with the first placing section-pressing section distance 23 and the second placing section-pressing section distance 24 and determining the distance is set. Besides, storage regions functioning as a work area, a temporary file, and the like for the CPU 27 and other various storage regions are set.

The CPU 27 performs control for gripping the object to be gripped 2 according to the program software 34 stored in the memory 28. The CPU 27 includes a space control section 40 as a specific function realizing section. The space control section 40 receives the input of data of the first placing section-pressing section distance 23 and the second placing section-pressing section distance 24 and instructs the space adjustment driving device 29 to move and stop the first supporting section 10 and the second supporting section 11. The space control section 40 adjusts the distance between the placing section 12 and the placing section 14.

Besides, the CPU 27 includes a placing section-pressing section distance calculating section 41 and a placing section-pressing section angle calculating section 42. The placing section-pressing section distance calculating section 41 receives the input of data detected by the first strain gauges 17. The data is data corresponding to a strain caused when the leaf spring section 13a bends. The placing section-pressing section distance calculating section 41 calculates the first angle 21 from the strain caused by the bending of the leaf spring section 13a of the pressing section 13. Similarly, the placing section-pressing section distance calculating section 41 calculates the second angle 22 from a strain caused by bending of the leaf spring section of the pressing section 15. Further, the placing section-pressing section distance calculating section 41 applies data of the first angle 21 and the second angle 22 and the length of the contact section 13b to the trigonometric function to calculate the first placing section-pressing section distance 23 and the second placing section-pressing section distance 24.

The placing section-pressing section angle calculating section 42 receives the input of data of strains detected by the second strain gauges 18. The data is data of a strain due to a twist of the leaf spring section 13a. The placing section-pressing section angle calculating section 42 calculates an angle formed by the placing section 12 and the pressing section 13 from the strain of the twisting of the leaf spring section 13a. Similarly, the placing section-pressing section angle calculating section 42 calculates an angle formed by the placing section 14 and the pressing section 15 from a strain of twisting of the leaf spring section of the pressing section 15.

Besides, the CPU 27 includes a correction calculating section 43. The correction calculating section 43 receives the input of data of an angle formed by the placing section 12 and the pressing section 13. Further, the correction calculating section 43 receives the input of data of an angle formed by the placing section 14 and the pressing section 15. The correction calculating section 43 performs calculation for correcting the distance between the placing section 12 and the pressing section 13 and the distance between the placing section 14 and the pressing section 15 according to degrees of twists of the pressing section 13 and the pressing section 15.

Further, the CPU 27 includes an inter-placing section distance determining section 44. The inter-placing section distance determining section 44 determines whether the distance between the placing section 12 and the placing section 14 reaches a determination value. The inter-placing section distance determining section 44 outputs a determination result to the space control section 40.

Besides, the CPU 27 includes a communication section 45. The communication section 45 performs communication with the robot 3 and receives, from the robot 3, the input of an instruction signal for gripping the object to be gripped 2 and an instruction signal for releasing the object to be gripped 2. The communication section 45 outputs the instruction signals to the space control section 40. Further, the communication section 45 receives the input of a signal from the space control section 40 and outputs an instruction signal for moving the robot hand 4 to the robot 3.

In this embodiment, the functions explained above are realized by the program software using the CPU 27. However, when the functions can be realized by a single electronic circuit (hardware) without using the CPU 27, such an electronic circuit can also be used.

Control Method for a Robot Hand

Figure 4:
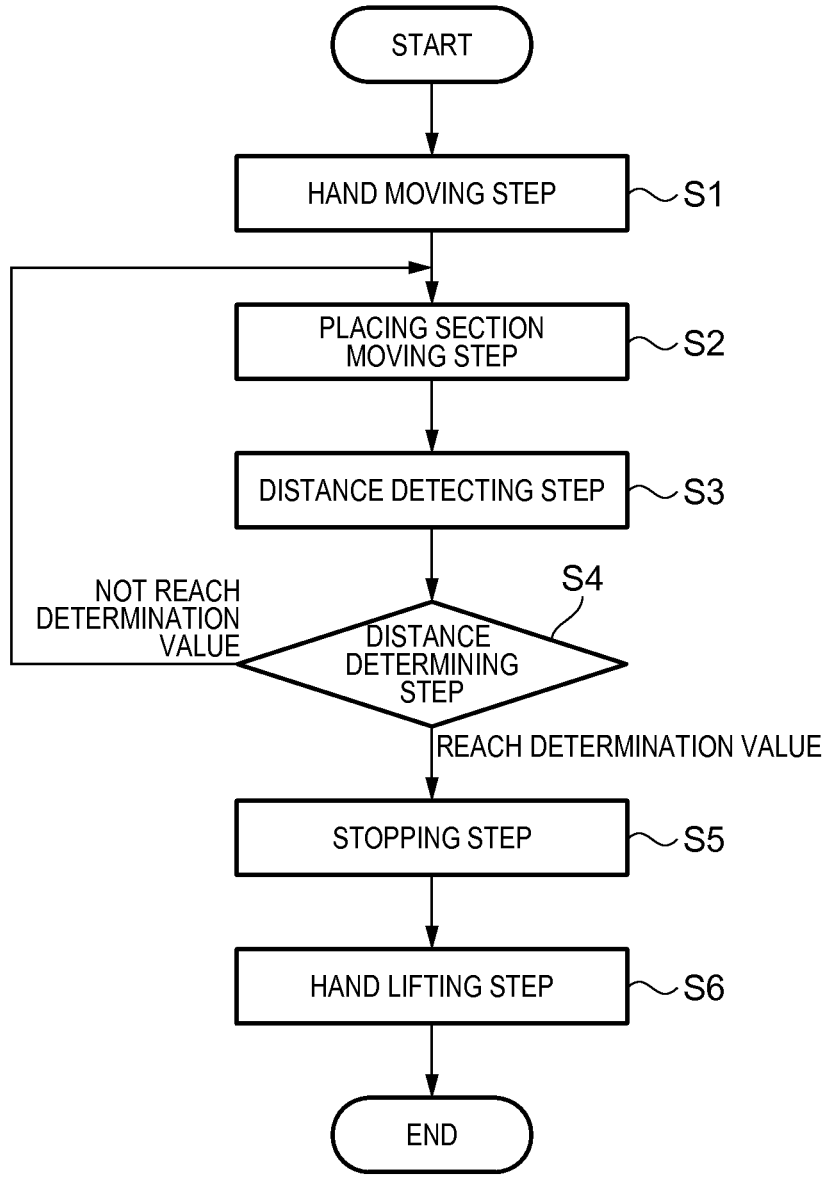
FIG. 4 is a flowchart showing gripping work.

A control method for a robot hand in gripping the object to be gripped 2 using the robot hand 4 is explained with reference to FIG. 4 to FIGS. 7A to 7D. FIG. 4 is a flowchart for explaining gripping work. FIGS. 5A to 5C to FIGS. 7A to 7D are schematic diagrams for explaining the control method for the robot hand in the gripping work.

In the flowchart of FIG. 4, step S1 is equivalent to a hand moving step. The step is a step for moving the placing section 12 and the placing section 14 to be closer to the placing table 1. Processing shifts to step S2. Step S2 is equivalent to a placing section moving step. The step is a step in which the placing section 12 and the placing section 14 move to the place between the placing table 1 and the object to be gripped 2 and reduce a space between the placing section 12 and the placing section 14. The processing shifts to step S3. Step S3 is equivalent to a distance detecting step. The step is a step in which the placing section-pressing section distance calculating section 41, the placing section-pressing section angle calculating section 42, and the correction calculating section 43 calculate the first placing section-pressing section distance 23 and the second placing section-pressing section distance 24 using strain data output by the first strain gauges 17 and the second strain gauges 18. The processing shifts to step S4. The step S4 is equivalent to a distance determining step. The step is a step for determining whether the first placing section-pressing section distance 23 and the second placing section-pressing section distance 24 reach the determination value. When the first placing section-pressing section distance 23 and the second placing section-pressing section distance 24 reach the determination value, this means that the placing section 12 and the placing section 14 reach places where the object to be gripped 2 is placed. At this point, the processing shifts to step S5. When the first placing section-pressing section distance 23 and the second placing section-pressing section distance 24 do not reach the determination value, the processing shifts to step S2.

Step S5 is equivalent to a stopping step. The step is a step in which the space adjusting section 9 stops the movement of the placing section 12 and the placing section 14. The processing shifts to step S6. The step S7 is equivalent to a hand lifting step. The step is a step in which the robot 3 lifts the robot hand 4. The robot hand 4 grips the object to be gripped 2 and ends the gripping work. The gripping work for gripping the object to be gripped 2 is completed according to the steps explained above.

Figure 5A:
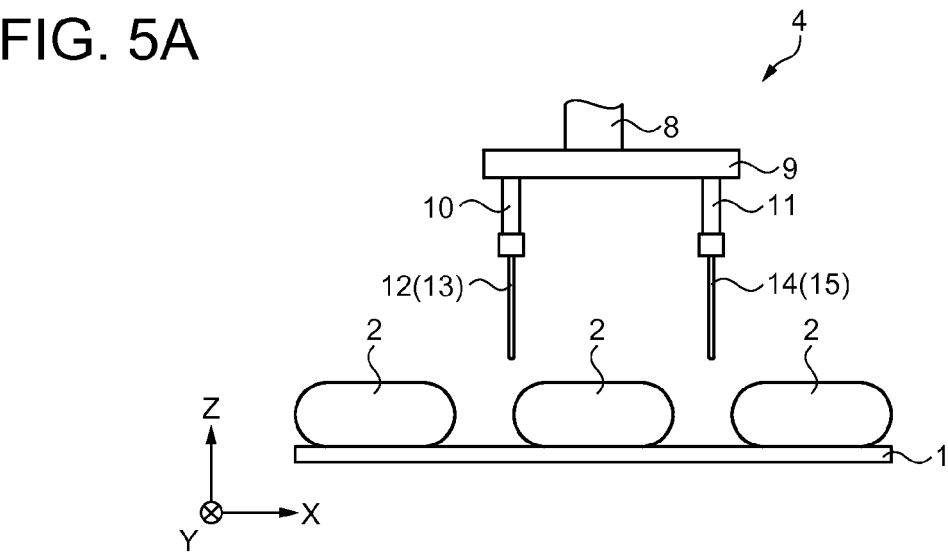
FIGS. 5A to 5C are schematic diagrams for explaining a control method for the robot hand in the gripping work.
Figure 5B:
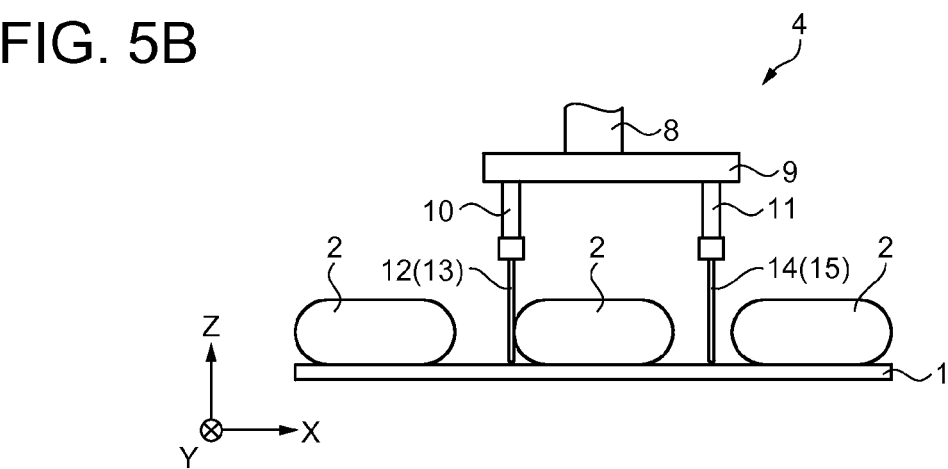

The control method for the robot hand in the gripping work in which the robot hand 4 grips the objet to be gripped 2 is explained in detail with reference to FIGS. 5A to 5C to FIGS. 7A to 7D in correspondence to the steps shown in FIG. 4. FIGS. 5A and 5B are diagrams corresponding to the hand moving step of step S1. As shown in FIG. 5A, in step S1, three objects to be gripped 2 are placed on the placing table 1. In the figure, a part of the placing table 1 and the objects to be gripped 2 is shown. A large number of objects to be gripped 2 are arranged on the placing table 1. Position accuracy of places where the objects to be gripped 2 are arranged is low. Spaces among the objects to be gripped 2 fluctuate.

The robot 3 moves the robot hand 4 to a place opposed to the object to be gripped 2. The space between the placing section 12 and the placing section 14 is set larger than the length in the X direction of the object to be gripped 2. As shown in FIG. 5B, subsequently, the robot 3 lowers the robot hand 4 to bring the placing section 12 and the placing section 14 closer to the placing table 1. At this point, since the positions of the objects to be gripped 2 fluctuate, the object to be gripped 2 is not always located in the center between the placing section 12 and the placing section 14. In this embodiment, an example in which the placing section 12 is located in a place close to the object to be gripped 2 compared with the placing section 14 is explained.

Figure 5C:
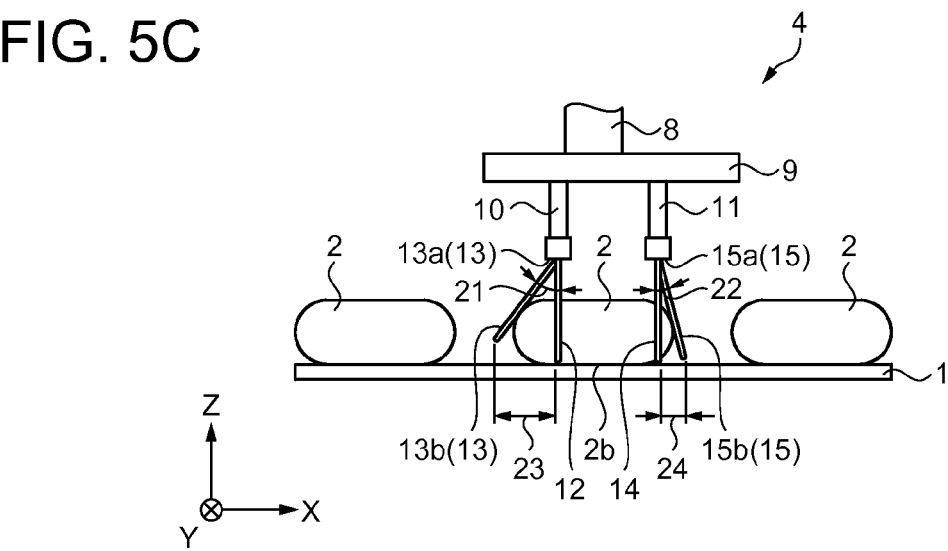

FIGS. 5C to 7C are diagrams corresponding to the placing section moving step of step S2, the distance detecting step of step S3, the distance determining step of step S4, and the stopping step of step S5. As shown in FIG. 5C, in step S2, the space control section 40 outputs, to the space adjustment driving device 29, an instruction signal for moving each of the first supporting section 10 and the second supporting section 11. The space adjusting section 9 moves the first supporting section 10 and the second supporting section 11. Consequently, the placing section 12 connected to the first supporting section 10 and the placing section 14 connected to the second supporting section 11 are moved and the space between the placing section 12 and the placing section 14 is reduced. The bar-like placing sections 12 and 14 move between the placing table 1 and the bottom 2b of the object to be gripped 2.

Further, the pressing section 13 connected to the first supporting section 10 and the pressing section 15 connected to the second supporting section 11 are moved. Consequently, parts of the contact section 13b of the pressing section 13 and the contact section 15b of the pressing section 15 come into contact with the object to be gripped 2 and incline. The leaf spring section 13a of the pressing section 13 and the leaf spring section 15a of the pressing section 15 are bent. In step S3, the first strain gauges 17 and the second strain gauges 18 output data indicating strain amounts to the CPU 27. The placing section-pressing section distance calculating section 41 receives the input of the data and calculates the first angle and the second angle 22. Subsequently, the placing section-pressing section distance calculating section 41 calculates the first placing section-pressing section distance 23 from the first angle 21 and calculates the second placing section-pressing section distance 24 from the second angle 22.

Figure 6A:
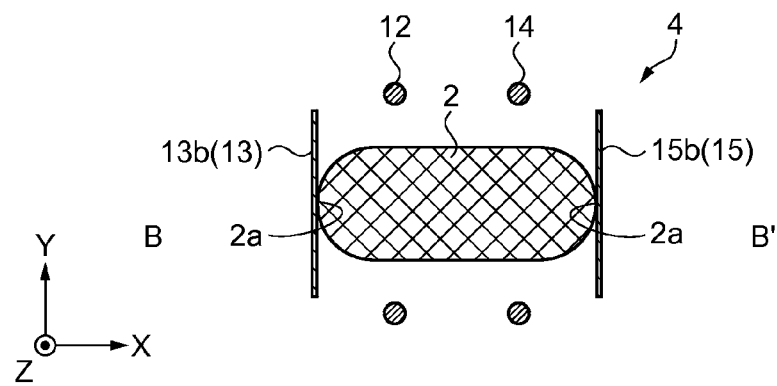
FIGS. 6A to 6D are schematic diagrams for explaining the control method for the robot hand in the gripping work.
Figure 6B:
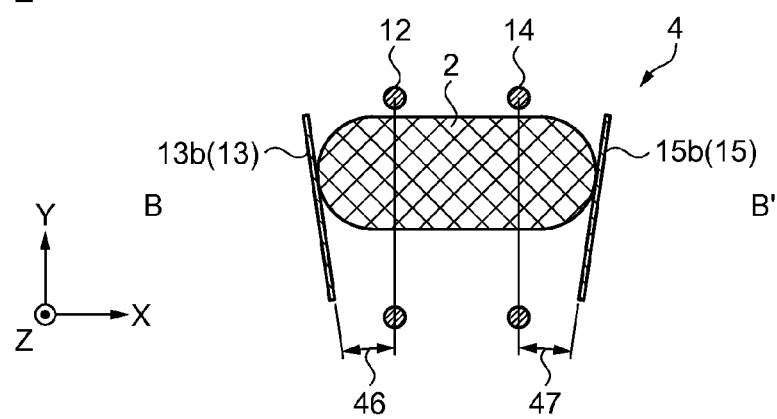
Figure 6C:
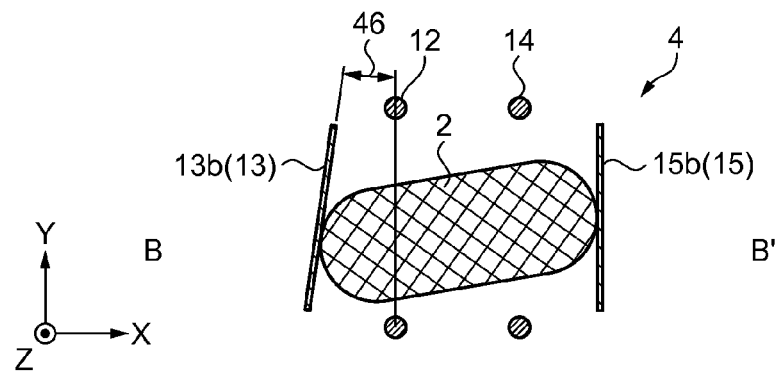

FIGS. 6A to 6C show three examples in which the positions of the object to be gripped 2 with respect to the placing section 12 and the placing section 14 are different. FIGS. 6A to 6C are schematic sectional views taken along line B-B' shown in FIG. 2A. In FIG. 6A, the object to be gripped 2 is located in the center of the placing section 12 and the center of the placing section 14 in the Y direction. At this point, the pressing section 13 and the pressing section 15 are parallel to the placing section 12 and the placing section 14 in plan view on the placing table 1. Therefore, since the pressing section 13 and the pressing section 15 do not twist, the placing section-pressing section angle calculating section 42 outputs data indicating the pressing section 13 and the pressing section 15 do not twist. The correction calculating section 43 sets correction amounts to "0" and outputs the correction amount.

In FIG. 6B, the object to be gripped 2 is located on the Y direction side of the placing section 12 and the Y direction side of the placing section 14. At this point, in the pressing section 13 and the pressing section 15, the Y direction sides of the contact section 13b and the contact section 15b come into contact with the side surfaces 2a of the object to be gripped 2. The pressing section 13 and the pressing section 15 tilt with respect to the placing section 12 and the placing section 14 in plan view on the placing table 1.

An angle formed by the placing section 12 and the contact section 13b of the pressing section 13 on the plane 1a of the placing table 1 is represented as first placing section-pressing section angle 46. An angle formed by the placing section 14 and the contact section 15b of the pressing section 15 is represented as second placing section-pressing section angle 47. Since both the pressing section 13 and the pressing section 15 twist, the placing section-pressing section angle calculating section 42 calculates and outputs the first placing section-pressing section angle 46 and the second placing section-pressing section angle 47. The correction calculating section 43 calculates correction amounts for correcting the positions of the placing section and the placing section 14 using the first placing section-pressing section angle 46 and the second placing section-pressing section angle 47 and outputs the correction amounts.

In FIG. 6C, the object to be gripped 2 is located in the centers of a −Y direction side of the placing section 12 and the placing section 14. At this point, in the pressing section 13, a −Y direction side of the contact section 13b comes into contact with the side surface 2a of the object to be gripped 2. In the pressing section 15, the center of the contact section 15b comes into contact with the side surface 2a of the object to be gripped 2. Consequently, the pressing section 13 tilts with respect to the placing section 12 in plan view on the placing table 1. The pressing section 15 is parallel to the placing section 14.

Since the pressing section 13 twists, the placing section-pressing section angle calculating section 42 calculates and outputs the first placing section-pressing section angle 46. The placing section-pressing section angle calculating section 42 outputs data indicating that the pressing section 15 does not twist. The correction calculating section 43 calculates a correction amount for correcting the position of the placing section 12 using the first placing section-pressing section angle 46 and outputs the correction amount. The correction calculating section 43 sets the correction amount to "0" and outputs the correction amount.

Figure 6D:
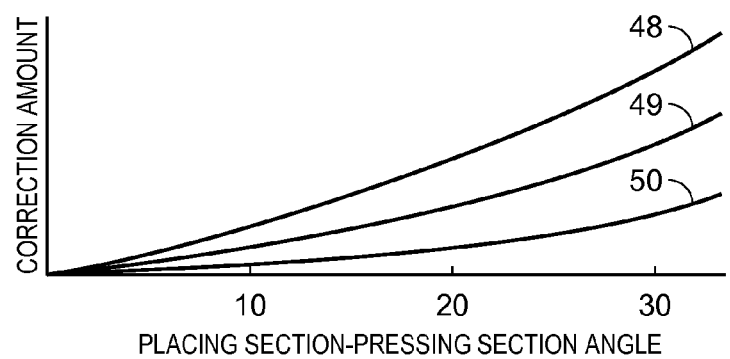

FIG. 6D is a graph showing a relation between placing section-pressing section angles and correction amounts. In FIG. 6D, the ordinate indicates the correction amounts and the abscissa indicates the placing section-pressing section angles. The correction amounts are correction amounts in correcting the positions of the placing section 12 and the placing section 14. The placing section-pressing section angles correspond to the first placing section-pressing section angle 46 and the second placing section-pressing section angle 47 calculated by the placing section-pressing section angle calculating section 42.

A first angle correction correlation line 48, a second angle correction correlation line 49, and a third angle correction correlation line 50 respectively indicate examples of correlation lines indicating the correction amounts corresponding to the placing section-pressing section angles. The correlation lines are one of work attribute data 35. The first angle correction correlation line 48, the second angle correction correlation line 49, and the third angle correction correlation line 50 are respectively set according to the shapes and the types of the objects to be gripped 2. For example, when the object to be gripped 2 is a cream croquette, the correction calculating section 43 calculates correction amounts using the second angle correction correlation line 49.

FIG. 7A is a graph showing transition of the first placing section-pressing section angle 46 at the time when the space adjusting section 9 moves the first supporting section 10. In FIG. 7A, the ordinate indicates the first placing section-pressing section angle 46 and the abscissa indicates the elapse of time. An angle transition line 51 indicates transition of the first placing section-pressing section angle 46 at the time when the first supporting section 10 is moved. The placing section-pressing section angle calculating section 42 calculates the first placing section-pressing section angle 46 using outputs of the second strain gauges 18.

The angle transition line 51 indicates an example in which the first placing section-pressing section angle 46 increases when the first supporting section 10 is moved. The first placing section-pressing section angle 46 is 0 degree before the pressing section 13 comes into contact with the object to be gripped 2. Time when the pressing section 13 comes into contact with the object to be gripped 2 is represented as contact time 52. When time reaches the contact time 52, the angle transition line 51 rises according to the movement of the first supporting section 10.

FIG. 7B is a graph showing an example of transition of the first placing section-pressing section distance 23 and the correction amount at the time when the space adjusting section 9 moves the first supporting section 10. In FIG. 7B, the ordinate indicates a moving amount of the placing section 12 and the abscissa indicates the elapse of time. The abscissas of FIGS. 7A and 7B indicate corresponding times. A moving amount transition line 53 indicates transition of the first placing section-pressing section distance 23 calculated using outputs of the first strain gauges 17. After the placing section 12 moves and the time reaches the contact time 52 when the pressing section 13 comes into contact with the object to be gripped 2, as indicated by the moving amount transition line 53, the placing section 12 and the pressing section 13 move away from each other according to the elapse of the time.

A correction amount transition line 54 indicates transition of a correction amount calculated by the correction calculating section 43 using data of the second angle correction correlation line 49 and the angle transition line 51. Since the first placing section-pressing section angle 46 increases according to the transition of the time, the correction amount also increases as indicated by the correction amount transition line 54.

A moving amount after correction transition line 55 is a transition line obtained by adding the correction amount transition line 54 to the moving amount transition line 53. That is, the moving amount after correction transition line 55 indicates transition of a distance obtained by applying correction of the influence of a twist of the pressing section 13 to the first placing section-pressing section distance 23 in the center of the contact section 13b. A determination value 56 is a value for determining whether the placing section 12 reaches a target position from the side surface 2a. Time when the moving amount after correction transition line 55 reaches the determination value 56 is represented as reaching time 57.

In step S4, the inter-placing section distance determining section 44 monitors the moving amount after correction transition line 55. When the moving amount after correction transition line 55 reaches the determination value 56, the processing shifts to step S5. In step S5, the space control section 40 stops the movement of the placing section 12. Consequently, the angle transition line 51, the moving amount transition line 53, the correction amount transition line 54, and the moving amount after correction transition line 55 stop rising. The relation between the placing section 12 and the pressing section 13 is explained above. The same control is performed in a relation between the placing section 14 and the pressing section 15. Therefore, explanation of the control is omitted.

As shown in FIG. 7C, in step S5, the space adjusting section 9 stops the movement of the first supporting section 10 and the second supporting section 11. When a distance obtained by correcting a twist of the pressing section 13 on the basis of the first placing section-pressing section distance 23 is represented as first placing section-pressing section distance after correction 58, which is a distance after correction, the first placing section-pressing section distance after correction 58 is the determination value 56. Similarly, when a distance obtained by correcting a twist of the pressing section 15 on the basis of the second placing section-pressing section distance 24 is represented as second placing section-pressing section distance after correction 59, which is a distance after correction, the second placing section-pressing section distance after correction 59 is also the determination value 56.

Therefore, since the placing section 12 and the placing section 14 are located at an equal distance from the side surfaces 2a of the object to be gripped 2, the robot hand 4 can stably grip the object to be gripped 2.

The determination value 56 is a value for indicating relative positions of the placing section 12 and the placing section 14 in the object to be gripped 2. The space between the placing section 12 and the placing section 14 is set according to the determination value 56. Further, the distance between the side surface 2a and the placing section 12 and the distance between the side surface 2a and the placing section 14 are set. Therefore, it is desirable to perform a preliminary experiment in advance and set the determination value 56 to locate the placing section 12 and the placing section 14 in places where the object to be gripped 2 can be stably gripped.

FIG. 7D is a diagram corresponding to the hand lifting step of step S6. As shown in FIG. 7D, in step S6, the robot 3 lifts the robot hand 4. The object to be gripped 2 is placed on the placing section 12 and the placing section 14. The side surfaces 2a on both the sides are pressed by the pressing section 13 and the pressing section 15. The placing section 12, the placing section 14, the pressing section 13, and the pressing section 15 in the object to be gripped 2 are respectively arranged in proper positions. Consequently, the object to be gripped 2 is stably gripped by the robot hand 4. Therefore, the robot 3 can safely convey the object to be gripped 2.

As explained above, according to this embodiment, effects explained below are attained.

(1) According to this embodiment, the robot hand 4 includes the bar-like placing sections 12 and 14. The space adjusting section 9 moves the placing section 12 and the placing section 14 and adjusts the space between the placing section 12 and the placing section 14. The place between the placing section 12 and the placing section 14 are set to a space smaller than the length of the object to be gripped 2, whereby it is possible to place the object to be gripped 2 on the placing section 12 and the placing section 14.

(2) According to this embodiment, the pressing section 13 and the pressing section 15 press the side surfaces 2a of the object to be gripped 2, whereby the distances between the placing sections 12 and 14 and the side surfaces 2a of the object to be gripped 2 are adjusted. Therefore, it is possible to stably place the object to be gripped 2 on the placing section 12 and the placing section 14. As a result, the robot hand 4 can grip the soft object to be gripped 2.

(3) According to this embodiment, when the objects to be gripped 2 are located side by side, the bar-like placing sections 12 and 14 are caused to pass among the adjacent objects to be gripped 2. Consequently, it is possible to move the placing section 12 and the placing section 14 to the bottom of the object to be gripped 2. Therefore, it is possible to grip the object to be gripped 2 even when the objects to be gripped 2 are located side by side.

(4) According to this embodiment, the placing section 12 and the pressing section 13 are paired and the placing section 14 and the pressing section 15 are paired. The space control section 40 controls the placing section 12 and the placing section 14 to set the first placing section-pressing section distance after correction 58 and the second placing section-pressing section distance after correction 59 to the same distance.

Since the pressing section 13 and the pressing section 15 press the side surfaces 2a of the object to be gripped 2, the pressing section 13 and the pressing section 15 are in contact with the side surfaces 2a. Therefore, since the placing section 12 and the placing section 14 are located in places at an equal distance from the side surfaces 2a of the object to be gripped 2, it is possible to set the distances between the center of gravity of the object to be gripped 2 and the placing section 12 and the placing section 14 to an equal distance. Therefore, the robot hand 4 can stably grip the object to be gripped 2.

(5) According to this embodiment, the placing section-pressing section distance calculating section 41 and the first strain gauges 17 detect the first placing section-pressing section distance 23 and the second placing section-pressing section distance 24. The placing section-pressing section angle calculating section 42 and the second strain gauges 18 detect the first placing section-pressing section angle 46 and the second placing section-pressing section angle 47.

The first placing section-pressing section angle 46 and the second placing section-pressing section angle 47 change according to places where the pressing sections 13 and 15 and the object to be gripped 2 are in contact. By detecting the first placing section-pressing section distance 23, the second placing section-pressing section distance 24, the first placing section-pressing section angle 46, and the second placing section-pressing section angle 47, even when the pressing section 13 and the pressing section 15 are in contact with the object to be gripped 2 on the tilt, it is possible to estimate places where the pressing sections 13 and 15 and the object to be gripped 2 are in contact. Consequently, it is possible to estimate a place where the object to be gripped 2 is located.

(6) According to this embodiment, the correction calculating section 43 calculates the first placing section-pressing section distance after correction 58 obtained by correcting the first placing section-pressing section distance 23 using the first placing section-pressing section angle 46. Further, the correction calculating section 43 calculates the second placing section-pressing section distance after correction 59 obtained by correcting the second placing section-pressing section distance 24 using the second placing section-pressing section angle 47. The space control section 40 controls the placing section 12 and the placing section 14 to set the first placing section-pressing section distance after correction 58 and the second placing section-pressing section distance after correction 59 in each of the pairs of the placing section 12 and the pressing section 13 and the placing section 14 and the pressing section 15 to the same distance.

Since the pressing section 13 and the pressing section 15 press the side surfaces 2a of the object to be gripped 2, the pressing section 13 and the pressing section 15 are in contact with the side surfaces 2a. Therefore, since the placing section 12 and the placing section 14 are located in places at an equal distance from the side surfaces 2a of the object to be gripped 2, it is possible to set the distances between the center of gravity of the object to be gripped 2 and the placing section 12 and the placing section 14 to an equal distance. Therefore, the robot hand 4 can stably grip the object to be gripped 2.

(7) According to this embodiment, the first strain gauges 17 and the second strain gauges 18 are elements that include resistors and can be easily manufactured. Therefore, since the robot hand 4 include the members that can be easily manufactured, it is possible to easily manufacture the robot hand 4.

(8) According to this embodiment, the direction in which the first strain gauges 17 detect strains and the direction in which the second strain gauges 18 detect strains are obliquely set. Therefore, when the first strain gauges 17 detect strains due to bending stress, the second strain gauges 18 can detect strains due to twisting stress. Therefore, it is possible to detect angles in bending of the pressing section 13 and the pressing section 15 and a rotation angle in twisting of the pressing section 13 and the pressing section 15.

(9) According to this embodiment, the pressing section 13 includes the leaf spring section 13a and the contact section 13b. The width of the leaf spring section 13a is smaller than the width of the contact section 13b. Consequently, the leaf spring section 13a easily bends and easily twits. The leaf spring section 13a bends according to the first placing section-pressing section distance 23 and twits according to the first placing section-pressing section angle 46. Since the first strain gage 17 and the second strain gauges 18 are set in the leaf spring section 13a, the first strain gauges 17 and the second strain gauges 18 can detect the first placing section-pressing section distance 23 and the first placing section-pressing section angle 46 with high sensitivity.

(10) According to this embodiment, the first strain gauges 17 and the second strain gauges 18 are set in the pressing section 13. The first strain gauges 17 and the second strain gauges 18 are electronic components and tend to be damaged by cleaning and sterilization. When the robot hand 4 grips the object to be gripped 2, a part of the object to be gripped 2 sometimes adheres to the placing section 12, the pressing section 13, the placing section 14, and the pressing section 15. When the object to be gripped adheres, it is possible to purify the placing section 12, the pressing section 13, the placing section 14, and the pressing section 15 by cleaning and sterilizing the placing sections and the pressing sections. The first strain gauges 17 and the second strain gauges 18 are set on the space adjusting section 9 sides of the pressing section 13 and the pressing section 15. Therefore, it is possible to clean and sterilize the pressing section 13, the pressing section 15, the placing section 12, and the placing section 14 in such a manner that the first strain gauges 17 and the second strain gauges 18 are not damaged by the cleaning and the sterilization.

(11) According to this embodiment, after the pressing section 13 and the pressing section 15 come into contact with the side surfaces 2a of the object to be gripped 2, the placing section 12 and the placing section 14 are moved until the first placing section-pressing section distance after correction 58 and the second placing section-pressing section distance after correction 59 reach the determination value 56. When the first placing section-pressing section distance after correction 58 and the second placing section-pressing section distance after correction 59 reach the determination value 56, the distance between the side surfaces 2a of the object to be gripped 2 and the placing section 12 and the placing section 14 is a predetermined distance. Therefore, the placing section 12 and the placing section 14 are located in places at the predetermined distance from the side surfaces 2a of the object to be gripped 2. The object to be gripped 2 is placed on the placing section 12 and the placing section 14. Therefore, the robot hand 4 can stably grip the object to be gripped 2.

Further, the first placing section-pressing section distance after correction 58 is a distance obtained by correcting an angle of the contact section 13b tilting with respect to the placing section 12 on the basis of the first placing section-pressing section distance 23. Similarly, the second placing section-pressing section distance after correction 59 is a distance obtained by correcting an angle of the contact section 15b tilting with respect to the placing section 14 on the basis of the second placing section-pressing section distance 24. Therefore, the robot hand 4 can grip, with high quality, the object to be gripped 2 irrespective of whether the pressing section 13 tilts with respect to the placing section 12. Similarly, the robot hand 4 can grip, with high quality, the object to be gripped 2 irrespective of whether the pressing section 15 tilts with respect to the placing section 14.

Second Embodiment

An embodiment of a robot hand is explained with reference to schematic diagrams for explaining a supporting structure of a pressing section in FIGS. 8A to 8D. This embodiment is different from the first embodiment in that a pressing section configured to press one side surface 2a of the object to be gripped 2 includes two plate-like members. Explanation of components same as the components in the first embodiment is omitted.

Figure 8A:
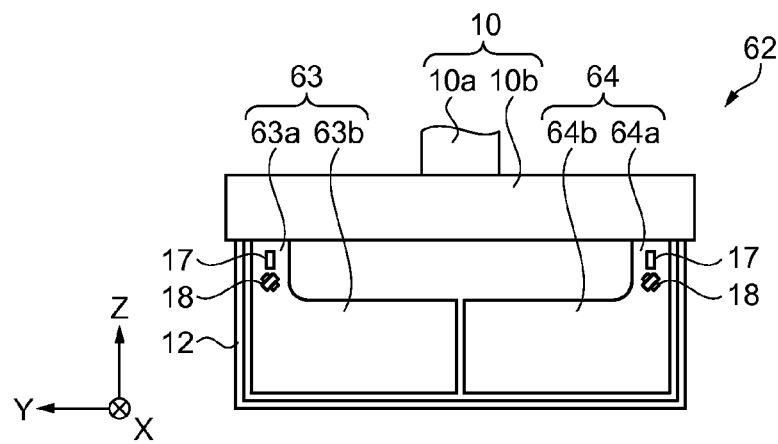
FIGS. 8A to 8D are schematic diagrams for explaining a supporting structure for a pressing section according to a second embodiment.

In this embodiment, as shown in FIG. 8A, a robot hand 62 includes the first supporting section 10 including the longitudinal member 10a and the lateral member 10b. The bar-like placing section 12 is set on the −Z side of the lateral member 10b. The lateral member 10b and the placing section 12 form a square frame. A first pressing section 63 and a second pressing section 64 are arranged side by side on the inner side surrounded by the lateral member 10b and the placing section 12.

The first pressing section 63 includes a leaf spring section 63a and a contact section 63b connected to the leaf spring section 63a. The leaf spring section 63a and the contact section 63b are formed from one metal plate. The leaf spring section 63a is fixed to the end on the Y side of the lateral member 10b. Similarly, the second pressing section 64 includes a leaf spring section 64a and a contact section 64b connected to the leaf spring section 64a. The leaf spring section 64a and the contact section 64b are formed from one metal plate. The leaf spring section 64a is fixed to the end on the −Y side of the lateral member 10b. The contact section 63b and the contact section 64b are parts that come into contact with the object to be gripped 2. The leaf spring section 63a and the leaf spring section 64a are parts that cause a bend and a twist.

The placing section 12 is arranged along one plane. The contact section 63b and the contact section 64b are set along the plane. Consequently, when viewed from the Y direction, the placing section 12, the first pressing section 63, and the second pressing section 64 are arranged to overlap. A place where a portion between the contact section 63b of the first pressing section 63 and the contact section 64b of the second pressing section 64 is located in the Y direction in the figure is the center of the placing section 12. Therefore, in the Y direction in the figure, the first pressing section 63 and the second pressing section 64 have a symmetrical shape with respect to the center of the placing section 12.

The first strain gauges 17 and the second strain gauges 18 are respectively set in the leaf spring section 63a and the leaf spring section 64a. Consequently, it is possible to detect angles of bending and angles of twisting of the contact section 63b and the contact section 64b with respect to the placing section 12.

Figure 8B:
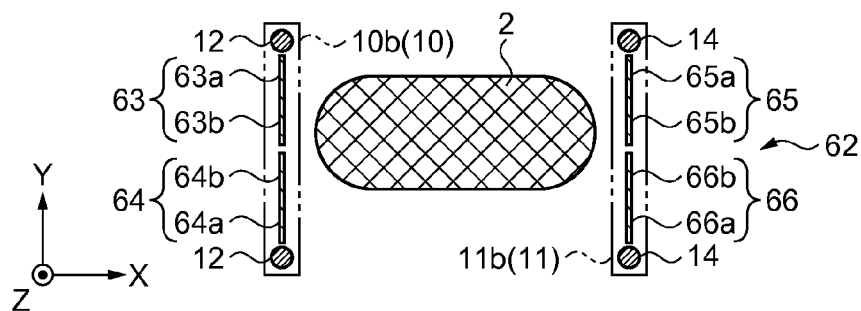

As shown in FIG. 8B, as in the first embodiment, the robot hand 62 includes the second supporting section 11 in a place opposed to the first supporting section 10. As in the first supporting section 10, the placing section 14 corresponding to the placing section 12 is set in the second supporting section 11. Further, a first pressing section 65 and a second pressing section 66 respectively corresponding to the first pressing section 63 and the second pressing section 64 are set in the second supporting section 11.

The shapes of the first pressing section 65 and the second pressing section 66 are respectively the same as the shapes of the first pressing section 63 and the second pressing section 64. The first pressing section 65 includes a leaf spring section 65a and a contact section 65b connected to the leaf spring section 65a. The leaf spring section 65a is fixed to the end on the Y side of the lateral member 11b. Similarly, the second pressing section 66 includes a leaf spring section 66a and a contact section 66b connected to the leaf spring section 66a. The leas spring section 66a is fixed to the end on the −Y side of the lateral member 11b. The first strain gauges 17 and the second strain gauges 18 are set in the leaf spring section 65a and the leaf spring section 66a. In this embodiment, an example in which the object to be gripped 2 is located further in the Y direction than the center of the robot hand 62 is explained.

Figure 8C:
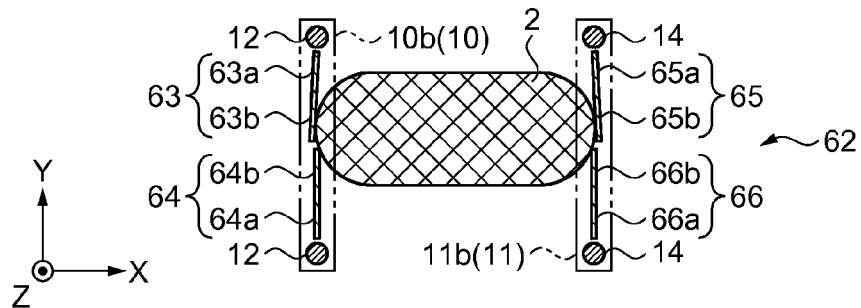

As shown in FIG. 8C, the space adjusting section 9 reduces a space between the first supporting section 10 and the second supporting section 11. Consequently, the first pressing section 63 and the first pressing section 65 come into contact with the object to be gripped 2. The contact section 63b of the first pressing section 63 twists around the leaf spring section 63a. The contact section 65b of the first pressing section 65 twists around the leaf spring section 65a. Consequently, the contact section 63b of the first pressing section 63 and the contact section 65b of the first pressing section 65 are obliquely pressed against the object to be gripped 2.

Figure 8D:
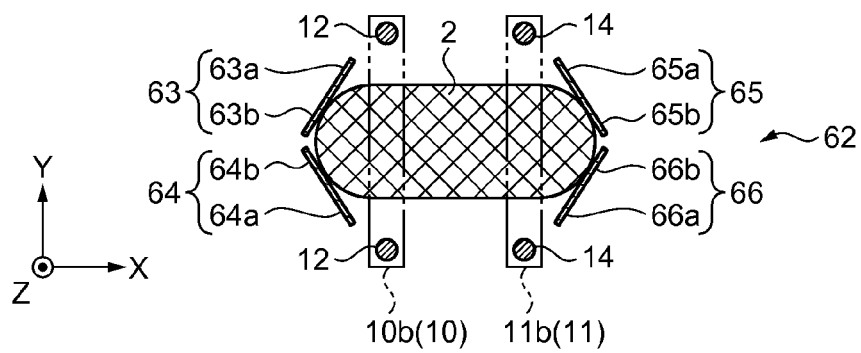

As shown in FIG. 8D, the space adjusting section 9 further reduces the space between the first supporting section 10 and the second supporting section 11. Consequently, forces of pressing of the object to be gripped 2 by the first pressing section 63 and the second pressing section 64 increase. The object to be gripped 2 is pressed strongly in the −Y direction in the figure by the first pressing section 63 compared with the second pressing section 64. Consequently, the object to be gripped 2 moves in the −Y direction on the placing table 1. The −X direction side of the object to be gripped 2 is located between the first pressing section 63 and the second pressing section 64. Similarly, the X direction side of the object to be gripped 2 is located between the first pressing section 65 and the second pressing section 66. Consequently, in the Y direction, the object to be gripped 2 is located in the centers of the first supporting section 10 and the second supporting section 11.

As explained above, according to this embodiment, effects explained below are attained.

(1) According to this embodiment, when the object to be gripped 2 comes into contact with the portion between the leaf spring section 63a and the second pressing section 64 in the contact section 63b of the first pressing section 63, the leaf spring section 63a of the first pressing section twists. Consequently, the first pressing section 63 rotates and the surface of the contact section 63b in contact with the object to be gripped 2 inclines.

Further, when the first pressing section 63 is moved to the object to be gripped 2 side, the object to be gripped 2 moves along the inclined surface of the contact section 63b of the first pressing section 63. Consequently, the object to be gripped 2 moves to a place between the first pressing section 63 and the second pressing section 64. The place between the first pressing section 63 and the second pressing section 64 is located in the center of the placing section 12. Therefore, since the robot hand 2 places the object to be gripped 2 near the center of the placing section 12, the robot hand 62 can stably grip the object to be gripped 2.

Third Embodiment

Figure 9:
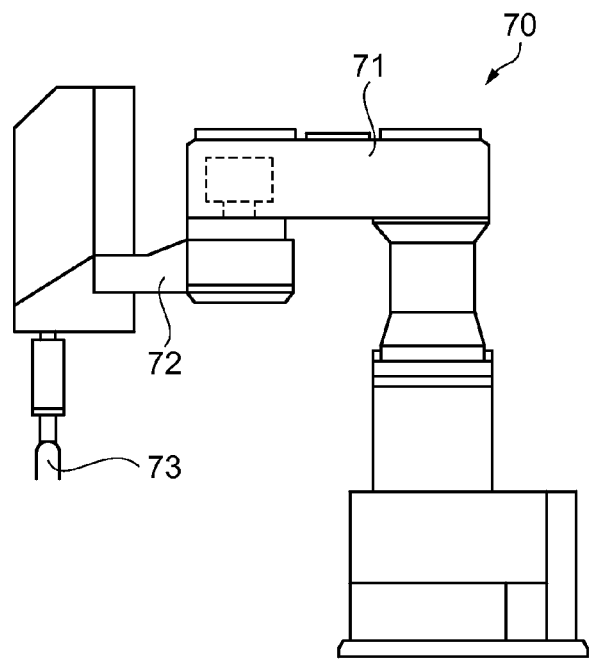
FIG. 9 is a schematic front view showing the structure of a robot according to a third embodiment.

A robot including the robot hand according to the embodiment explained above is explained with reference to FIGS. 9 and 10. FIG. 9 is a schematic front view showing the structure of the robot. As shown in FIG. 9, a robot 70 includes a first arm 71. A second arm 72 is set to be connected to the first arm 71. A robot hand 73 is set in the second arm 72.

As the robot hand 73, the robot hand 4 or the robot hand 62 explained above is used. Therefore, the robot 70 can cause the robot hand 73 to stably grip the object to be gripped 2.

Figure 10:
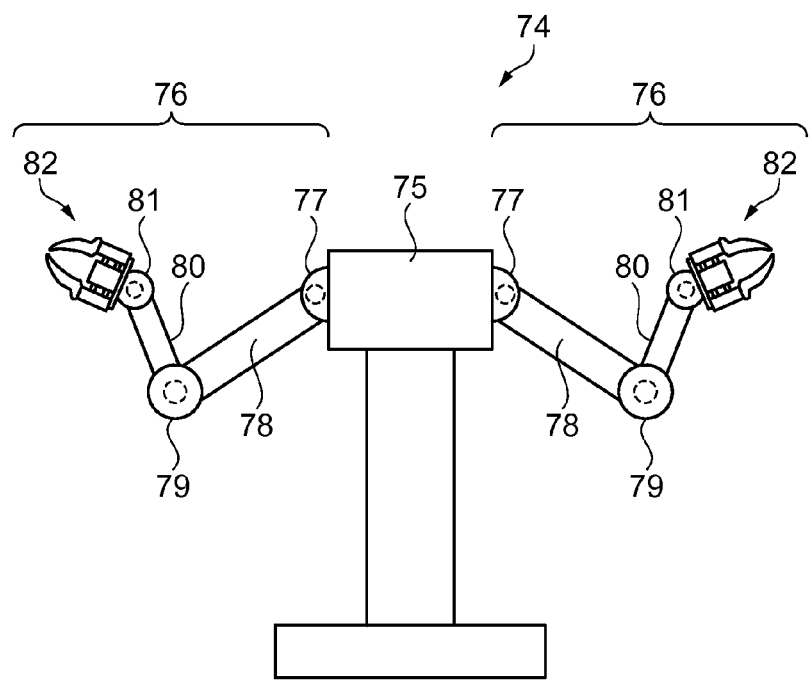
FIG. 10 is a schematic front view showing the structure of a double-arm robot.

FIG. 10 is a schematic front view showing the structure of a double-arm robot. As shown in FIG. 10, a double-arm robot 74 functioning as a robot includes a main body section 75. A pair of arm sections 76 is set to be connected to the main body section 75. In each of the arm sections 76, a shoulder joint section 77, a first link 78, an elbow joint section 79, a second link 80, a wrist joint section 81, and a robot hand 82 are set in this order.

As the robot hand 82, the robot hand 4 or the robot hand 62 explained above is used. Therefore, the double-arm robot 74 can cause the robot hand 82 to stably grip the object to be gripped 2.

As explained above, according to this embodiment, effects explained below are attained.

(1) According to this embodiment, the robot hand 73 included in the robot 70 is the robot hand 4 or the robot hand 62 explained above. The robot hand 4 or the robot hand 62 can stably grip the object to be gripped 2. Therefore, the robot 70 can be the robot 70 including the robot hand 4 or the robot hand 62 that can stably grip the object to be gripped 2.

(2) According to this embodiment, the robot hand 82 included in the double-arm robot 74 is the robot hand 4 or the robot hand 62 explained above. The robot hand 4 or the robot hand 62 can stably grip the object to be gripped 2. Therefore, the double-arm robot 74 can be the double-arm robot 74 including the robot hand 4 or the robot hand 62 that can stably grip the object to be gripped 2.

Embodiments of the invention are not limited to the embodiments explained above. The embodiments can be variously modified and improved. Modifications are explained below.

Modification 1

In the first embodiment, the space adjusting section 9 includes the first space adjusting section 9a configured to move the first supporting section 10 and the second space adjusting section 9b configured to move the second supporting section 11. However, the function of the space adjusting section 9 may be a function of simultaneously moving the first supporting section 10 and the second supporting section 11 by the same distance. The space adjusting section 9 includes a function of simultaneously changing the distances of the first supporting section 10 and the second supporting section 11.

As the driving method, the placing section moving step of step S2 to the distance determining step of step S4 are repeated. The steps are repeated until one of the first placing section-pressing section distance after correction 58 and the second placing section-pressing section distance after correction 59 reaches the determination value 56. Subsequently, the robot 3 is driven to move the robot hand 4 to set the first placing section-pressing section distance after correction 58 and the second placing section-pressing section distance after correction 59 to the same distance. Then, the placing section moving step of step S2 to the distance determining step of step S4 are repeated. According to this method, it is possible to set the first placing section-pressing section distance after correction 58 and the second placing section-pressing section distance after correction 59 to the determination value 56.

According to this method, the robot hand 4 can stably grip the object to be gripped 2. Further, since the robot hand 4 moves the placing section 12 and the placing section 14 without moving the object to be gripped 2, it is possible to move the placing section 12 and the placing section 14 with a small force. Moreover, since the space adjusting section 9 only has to include a mechanism for moving the first supporting section 10 and the second supporting section 11 in the same manner, it is possible to reduce the number of moving mechanisms.

Modification 2

In the first embodiment, the first placing section-pressing section distance after correction 58 is compared with the determination value 56 in the distance determining step of step S4. The first placing section-pressing section distance after correction 58 is distance in the X direction between the end of the pressing section 13 and the placing section 12. However, the first placing section-pressing section distance after correction 58 may be a distance in the X direction between a place where the pressing section 13 comes into contact with the object to be gripped 2 and the placing section 12. The first placing section-pressing section distance after correction 58 is calculated from the first angle 21 and the first placing section-pressing section angle 46 and shape data of the object to be gripped 2. Consequently, it is possible to arrange the placing section 12 and the placing section 14 in places suitable for the shape of the object to be gripped 2. Therefore, it is possible to stably grip the object to be gripped 2 irrespective of the shape of the object to be gripped 2.

Modification 3

In the first embodiment, the longitudinal member 10a and the longitudinal member 11a are the parts, the lengths of which in the Z direction do not change. However, liner moving mechanisms may be set in the longitudinal member 10a and the longitudinal member 11a to change the longitudinal member 10a and the longitudinal member 11a to parts that can expand and contract in the Z direction. When the longitudinal member 10a is contracted, the placing section 12 rises and bites the object to be gripped 2. Therefore, it is possible to prevent relative positions of the placing section 12 and the object to be gripped 2 from easily changing. When the object to be gripped 2 tends to slip on the placing table 1, one of the placing section 12 and the placing section 14 desired to be fixed is lifted. Then, the other placing section is moved. Consequently, it is possible to move one placing section without moving the object to be gripped 2. As a result, it is possible to accurately arrange the placing section 12 and the placing section 14.

Modification 4

In the first embodiment, the pair of the placing section 12 and the placing section 14 is arranged to be opposed to each other. However, for example, when the object to be gripped 2 has a triangular plate shape, the number of placing sections may be three. That is, the number of placing sections may be set to three or more according to the shape of the object to be gripped 2. The number of placing sections may be set according to the shape of the object to be gripped 2. Consequently, it is possible to stably grip the object to be gripped 2.

Modification 5

In the first embodiment, the correction calculating section 43 calculates the first placing section-pressing section distance after correction 58 and the second placing section-pressing section distance after correction 59. The space control section 40 drives the space adjusting section 9 to adjust the positions of the placing section 12 and the placing section 14. However, the robot 3 may move the robot hand 4 to set the first placing section-pressing section angle 46 and the second placing section-pressing section angle 47 to 0 degree. In this case, as in the first embodiment, it is possible to arrange the placing section 12 and the placing section 14 with high position accuracy. Therefore, the robot hand 4 can grip the object to be gripped 2 with high quality.

Modification 6

In the first embodiment, the first strain gauges 17 are set on both the surfaces of the pressing section 13. However, when the first strain gauges 17 can detect strains with high sensitivity, the first strain gauge 17 may be set only on one surface of the pressing section 13. Therefore, the first strain gauges 17 can be saved. Likewise, in the first embodiment, the second strain gauges 18 are set on both the surfaces of the pressing section 13. However, when the second strain gauges 18 can detect strains with high sensitivity, the second strain gauges 18 may be set only on one surface of the pressing section 13. Therefore, the second strain gauges 18 can be saved.

In the first embodiment, the second strain gauges 18 are set in the orthogonal two directions. However, when the second strain gauges 18 can detect strains with high sensitivity, the second strain gauge 18 may be set in one direction of the pressing section 13. Therefore, the second strain gauges 18 can be saved.

The entire disclosure of Japanese Patent Application No. 2012-023822 filed Feb. 7, 2012 is expressly incorporated by reference herein.

What is claimed is:

1. A robot hand comprising:
a plurality of bar-like placing sections on which the object to be gripped is placed;
pressing sections paired with the placing sections and configured to press side surfaces of the object to be gripped;
a space adjusting section configured to move the placing sections to adjust a space between the plurality of placing sections and move the pressing sections to bring the pressing sections into contact with the object to be gripped; and
a detecting section configured to detect an inclination angle formed by the placing section and the pressing section paired with each other and a placing section-pressing section angle, which is a twisting angle of the pressing section with respect to the placing section, wherein
the robot hand grips the object to be gripped.

2. The robot hand according to claim 1, further comprising a control section configured to calculate a placing section-pressing section distance, which is the distance between the placing section and the pressing section paired with each other, and a distance after correction obtained by correcting the placing section-pressing section distance using the twisting angle and control the placing sections to set the distances after correction in the plurality of pairs of the placing sections and the pressing sections to a same distance.

3. The robot hand according to claim 1, wherein
the detecting section includes:
a first strain gauge set in the pressing section and configured to detect the placing section-pressing section distance using a strain in bending the pressing section; and
a second strain gauge configured to detect the placing section-pressing section angle using a strain in twisting the pressing section, and
a direction in which the second strain gauge detects the strain is set obliquely with respect to a direction in which the first strain gauge detects the strain.

4. The robot hand according to claim 3, wherein
the pressing section includes a contact section configured to come into contact with the object to be gripped and a leaf spring section connected to the contact section and having elasticity, the first strain gauge and the second strain gauge being set in the leaf spring section, and
width of the leaf spring section is smaller than width of the contact section.

5. The robot hand according to claim 1, wherein
the pressing section is connected to the space adjusting section, and
the detecting section is set on the space adjusting section side of the pressing section.

6. The robot hand according to claim 4, wherein
the pressing section includes a first pressing section and a second pressing section arranged side by side,
each of the first pressing section and the second pressing section includes the leaf spring section and the contact section, and
a place between the first pressing section and the second pressing section is located in a center of the placing section.

7. The robot hand according to claim 1, wherein
the detecting section includes:
a first sensor configured to detect an inclination angle formed by the placing section and the pressing section paired with each other; and
a second sensor configured to detect a twisting angle of the pressing section twisted with respect to the placing section.

8. A control method for a robot hand that grips an object to be gripped on a placing table, the control method comprising:
moving a plurality of pairs of placing sections and pressing sections, moving a plurality of bar-like placing sections between the placing table and the object to be gripped, and bringing the pressing sections into contact with side surfaces of the object to be gripped;
detecting a placing section-pressing section distance, which is a distance between the placing section and the pressing section paired with each other, detecting a placing section-pressing section angle, which is an angle of the pressing section with respect to the placing section, and calculating a distance after correction obtained by correcting the placing section-pressing section distance using the placing section-pressing section angle;
determining whether the distance after correction reaches a determination value; and
ending the movement of the placing sections when the distance after correction reaches the determination value, wherein
the movement of the placing sections, the detection of the distances, and the determination of the distance after correction are repeated to set the distance after correction to a distance indicated by the determination value.

9. A robot comprising a robot hand, wherein the robot hand is the robot hand according to claim 1.

10. A robot comprising:
a robot hand including a plurality of bar-like placing sections on which an object to be gripped is placed, pressing sections paired with the placing sections and configured to press side surfaces of the object to be gripped, a space adjusting section configured to move the placing sections to adjust a space between the plurality of placing sections and move the pressing sections to bring the pressing sections into contact with the object to be gripped, and a detecting section configured to detect an inclination angle formed by the placing section and the pressing section paired with each other and a placing section-pressing section angle, which is a twisting angle of the pressing section twisted with respect to the placing section;
a movable section configured to move the robot hand; and
a control section configured to control actions of the robot hand and the movable section, wherein
the control section moves the placing sections to adjust a space between the plurality of placing sections and moves the pressing sections to bring the pressing sections into contact with the object to be gripped, and
the control section controls the placing sections and the movable section to set the distances between places where the pressing sections in the pairs of the plurality of placing sections and the pressing sections come into contact with the object to be gripped and the placing sections to a same distance.

* * * * *